(12) United States Patent
Brodbeck et al.

(10) Patent No.: US 11,008,455 B2
(45) Date of Patent: May 18, 2021

(54) CURABLE ADHESIVE COMPOUND AND REACTIVE ADHESIVE TAPES BASED THEREON

(71) Applicant: TESA SE, Norderstedt (DE)

(72) Inventors: Markus Brodbeck, Stuttgart (DE); Alexander Fischer, Hamburg (DE); Marco Kupsky, Quickborn (DE)

(73) Assignee: TESA SE, Norsderstedt (DE)

( * ) Notice: Subject to any disclaimer, the term of this patent is extended or adjusted under 35 U.S.C. 154(b) by 211 days.

(21) Appl. No.: 16/316,283

(22) PCT Filed: Jun. 15, 2017

(86) PCT No.: PCT/EP2017/064717
§ 371 (c)(1),
(2) Date: Jan. 8, 2019

(87) PCT Pub. No.: WO2018/007123
PCT Pub. Date: Jan. 11, 2018

(65) Prior Publication Data
US 2020/0181390 A1    Jun. 11, 2020

(30) Foreign Application Priority Data
Jul. 8, 2016   (DE) .................... 10 2016 212 508.7

(51) Int. Cl.
| | | |
|---|---|---|
| C09D 163/00 | (2006.01) | |
| C08L 63/00 | (2006.01) | |
| C08G 59/50 | (2006.01) | |
| C08L 75/04 | (2006.01) | |
| C09J 163/00 | (2006.01) | |
| C09J 175/04 | (2006.01) | |
| C08K 3/013 | (2018.01) | |
| C08K 5/00 | (2006.01) | |
| C08K 5/17 | (2006.01) | |
| C08K 5/5419 | (2006.01) | |

(52) U.S. Cl.
CPC .............. C08L 63/00 (2013.01); C08L 75/04 (2013.01); C09J 163/00 (2013.01); C09J 175/04 (2013.01); C08K 3/013 (2018.01); C08K 5/0025 (2013.01); C08K 5/17 (2013.01); C08K 5/5419 (2013.01)

(58) Field of Classification Search
None
See application file for complete search history.

(56) References Cited

U.S. PATENT DOCUMENTS

| | | | |
|---|---|---|---|
| 3,639,500 A | | 2/1972 | Muny et al. |
| 5,204,385 A | * | 4/1993 | Naderhoff .......... C08G 59/1477 523/402 |
| 5,543,486 A | | 8/1996 | Abe et al. |
| 8,124,232 B2 | | 2/2012 | Abe |
| 2002/0002232 A1 | * | 1/2002 | Sagiv ..................... C08L 75/04 524/501 |
| 2003/0118834 A1 | | 6/2003 | Dashiell |
| 2007/0148445 A1 | * | 6/2007 | Licht ..................... C09J 175/06 428/355 EP |
| 2013/0267663 A1 | | 10/2013 | Sato |
| 2015/0240136 A1 | | 8/2015 | Elgimiabi et al. |

FOREIGN PATENT DOCUMENTS

| | | |
|---|---|---|
| DE | 695 13 309 T2 | 7/2000 |
| DE | 101 39 790 A1 | 3/2003 |
| DE | 10 2013 227 142 A1 | 6/2015 |
| EP | 0 625 558 A1 | 11/1994 |
| EP | 1 028 151 B1 | 4/2002 |
| EP | 2 653 492 A1 | 10/2013 |
| WO | 2009/060576 A1 | 5/2009 |
| WO | 2012/081192 A1 | 6/2012 |

OTHER PUBLICATIONS

C. Donker, "The Chemistry of Tackifying Resins", PSTC Annual Technical Seminar Proceedings, pp. 149-164 (2001).
Search Report dated Mar. 9, 2017 in connection with German Patent Application No. 10 2016 212 508.7.
Interntional Search Report and Written Opinion issued in connection with PCT International Application No. PCT/EP2017/064717, (dated 2017).

\* cited by examiner

*Primary Examiner* — Michael J Feely
(74) *Attorney, Agent, or Firm* — Norris McLaughlin, P.A.

(57) ABSTRACT

The invention relates to a dispersion comprising one or more protic solvents as dispersion medium and also, as base components dispersed therein,
  one or more matrix polymers,
  one or more epoxides,
  at least one kind of a modified compound of the polyamine adduct type which is insoluble in the epoxides,
  where the at least one modified polyamine adduct is in dispersion in particulate form, with 90% of the particles having a particle size in the range from 0.1 to 10 μm as determined by laser diffractometry.

28 Claims, 1 Drawing Sheet

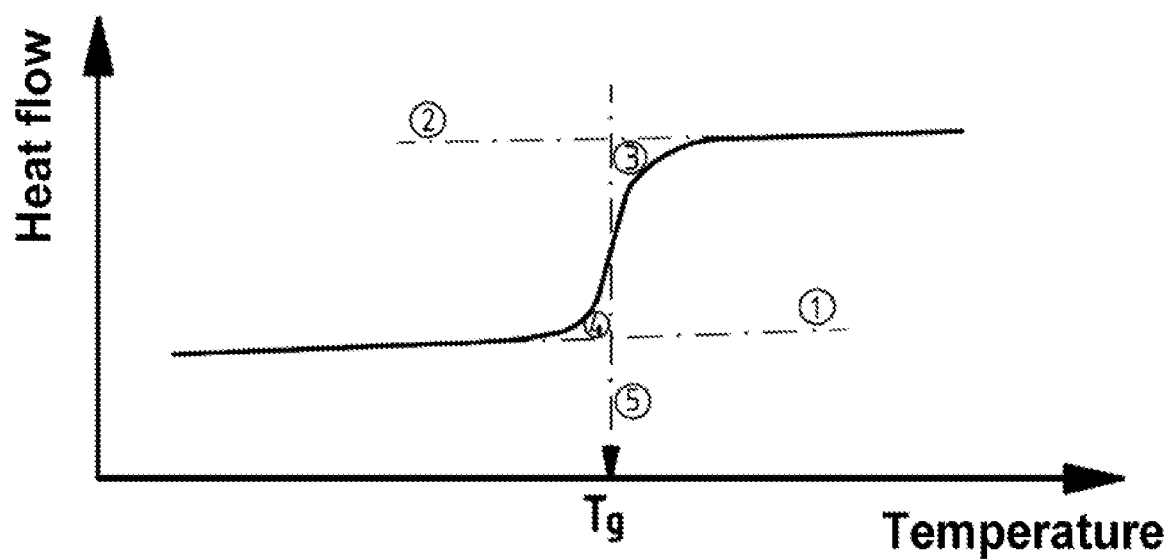

CURABLE ADHESIVE COMPOUND AND REACTIVE ADHESIVE TAPES BASED THEREON

This application is a § 371 national stage of PCT International Application No. PCT/EP2017/064717, filed Jun. 15, 2017, which claims foreign priority benefit under 35 U.S.C. § 119 of German Patent Application No. 10 2016 212 508.7, filed Jul. 8, 2016, the disclosures of each of which are incorporated herein by reference.

The invention relates to a thermally curable, epoxide-based, latent reactive adhesive composition and to storable adhesive tapes obtainable therewith, and also to a preparation for producing such adhesive compositions.

BACKGROUND

Adhesive tapes are nowadays used in a diversity of forms, for example as auxiliaries in processes and for joining different objects. Self-adhesive tapes comprising pressure-sensitive adhesive compositions have permanent tack. They are able to exert their joining function without further curing, typically immediately after bonding. With self-adhesive tapes of this kind it is possible to realize sometimes very high bond strengths. In spite of this, there is a need in certain applications for adhesive solutions which permit even greater bond strengths. Many such adhesive systems are applied in a hot compression step. Under such conditions, they melt, wet the bond substrate, and develop strength by solidifying as they cool. Adhesive systems of this kind may still, moreover, have chemical reactivity if these adhesive systems have been admixed with reactive systems which react with one another and thereby cure the adhesively bonded assembly.

The term "curable adhesive composition" in the sense of this invention refers to a preparation which comprises functional groups which, by the action of a curing component in combination with increased temperature as an additional stimulus are able to participate in a reaction leading to an increase in molar mass and/or to crosslinking at least of one constituent of the preparation.

The terms "curing agent", "initiator" and "activator" are used synonymously in the sense of this invention. They describe substances or substance mixtures which are able to bring about a curing reaction with participation of molecules—especially macromolecules—having functional groups—such as epoxide functionalities, for example—after an activation temperature has been exceeded. The curing reaction is generally accompanied by a linking reaction or a crosslinking reaction of the functionalized molecules by means of the curing agent molecules.

With reactive adhesive tapes the requirement is that the adhesive systems can be processed rapidly, in particular in terms of the activation time for the initiation of the curing reaction. Besides the activation, full curing as well is to proceed rapidly to the desired degree of curing. A particularly advantageous reactive system in this context is based on epoxides. Curable epoxide adhesive systems are well-known in liquid form and in adhesive tape form, and are part of the prior art. They are diversely employed.

Curable adhesive systems which are employed in the form of adhesive tapes comprise, in one of their realization variants, a film former component, which may for example be a thermoplastic polymer, an elastomer or a thermoplastic elastomer, and a reactive component, consisting for example of an epoxide-based reactive resin, and also a curing agent system (also referred to as activator system or initiator system).

Through the use of the film former component and the associated production process—in the form of dissolving, mixing, coating from solvents, or mixing, metering, extrusion as a hotmelt—these reactive adhesive tapes are usually supplied with thermal energy even before they are employed in the actual adhesive application. For epoxide-based reactive adhesive tapes, therefore, it is necessary to use what is called a "latent" curing agent system which is not (yet) activated by the thermal energy introduced in the adhesive tape production process. Accordingly, the process is typically limited to curing agent systems having high activation energies, since there are only limited degrees of freedom with regard to the temperatures to be selected.

Another processing approach is afforded by adhesive tape systems, involving the film former component being constructed only in the coating step at room temperature, by means of polyurethane crosslinking, for example. In relation to such systems as well, however, process-related reasons frequently impose limits, because, for example, the cohesion that is needed in the case of coating is absent or has to be achieved by additional additization.

In the case of curable adhesive systems which are to be employed in the form of reactive adhesive tapes, there is typically a need, moreover, to ensure sufficient storage stability under storage conditions, allowing the reactive adhesive tape to be straightforwardly transported and stocked, before the actual reactivity is intended to emerge only in the activation step and under activation conditions. Without such latency, the practicability of aforesaid adhesive tapes is limited. Although many epoxy systems can also be cured by UV radiation, with an appropriate curing agent, thermal curing methods are preferred in many industrial bonding processes, since radiation sources cannot always be integrated into manufacturing lines. Moreover, adhesive composition located in shadow regions is not so easily activatable by radiation. Radiation curing in complex bondline geometries is therefore not universally a possibility.

Epoxide Adhesive Tapes in the Prior Art

Epoxy resins based on glycidyl ethers are cured in an economically rational way using, for example, polyamines, polyamides or acid anhydrides; in this regard compare, for example, specification DE 695 13 309 T2. For cycloaliphatic epoxy resin systems, furthermore, cationic crosslinking mechanisms, involving what are called super acids, are also described.

US 20150240136 A1 describes a reactive adhesive tape based on epoxides and on what is probably the most well-known curing agent system, dicyandiamide (DICY). In this case the curing agent, which is in powder form and is insoluble at room temperature, is dispersed in very fine division into the epoxy resin and the film former component. When a compression temperature is applied, the DICY curing agent dissolves in the epoxide and becomes commixed, and the amine-epoxide reaction takes place. To lower the solubility temperature needed for this purpose, of 160 to 200° C., an accelerator based on a urea compound is added. This allows the activation temperature to be lowered down to 140° C. Film formers used are thermoplastics having a softening range of 60 to 120° C. To offer such mixtures in products in web form—in other words, as adhesive tapes—the mixture must be dissolved in a solvent and homogenized. In the subsequent coating process, after coating has taken place, the solvent is evaporated off. The stated specification also describes the likewise possible path of coating out the reactive adhesive tape solventlessly via a melt at 60° C. At this temperature, however, the curing agent/accelerator system used (DICY/UREA) cannot be soluble.

To cure the reactive adhesive tape, the adhesive bonded assembly is stored in a forced air oven at 180° C. for 30 minutes.

Specification EP 1 028 151 B1 sets out a further crosslinking reaction of epoxides in adhesive tapes. The curing agent is a maleic anhydride, which is incorporated by polymerization into the film former component. For the crosslinking of epoxy resin and maleic anhydride, temperatures of 120 to 180° C. for 3 to 30 minutes are recommended; described by way of example is a bonding process of 160° C. for 10 minutes at an applied pressing pressure of 6 bar.

Latent Curing Agent Systems in the Prior Art

Latent curing agent systems for epoxide crosslinking, besides the aforementioned DICY system, are melamines, polyamines, polyamine-epoxy adducts, DBA dihydrazines, boron trifluoride-amine complexes, guanamines and imidazoles, for example.

Specification EP 2 653 492 A sets out pros and cons of such systems.

WO 2009/060576 A relates to a latent curing agent system based on polyamine adducts, especially their production processes. The resulting curing agent systems can be incorporated insolubly into epoxides, and initiate the crosslinking of the epoxy resins from an activation temperature of 80 to 130° C.

U.S. Pat. No. 8,124,232 B2 describes an electroconductive epoxide paste for the bonding and electrical contacting of components on circuit boards. Curing agents identified include microencapsulated polyamine adducts having a melting range—corresponding to a curing agent activation range—of ~80° C.

The prior art therefore results in epoxide-based adhesive tapes which are storable at room temperature and have high application temperatures and/or long working times, or in epoxide-based, one-component liquid or paste adhesives which are storable at room temperature and have working temperatures and times that are advantageous for the particular fields of application.

Examples of curing agents for epoxide systems which are processed in the liquid state or in the melt are latent reactive diamines or polyfunctional amines, dicarboxylic acids or polyfunctional dicarboxylic acids, difunctional acid anhydrides or polyfunctional acid anhydrides, primary dithiols or polyfunctional primary thiols, for example.

OBJECT OF THE INVENTION

There is a need for curable adhesive compositions for reactive adhesive tapes which are able by activation to develop high bond strengths within from seconds to a few minutes at relatively moderate temperatures. The curing agent system in the curable adhesive tape here is to have a latency whose stability allows the tape to be stored at least at room temperature for a rational time.

In order to provide an optimum trade-off between these contrary requirements, the demand is therefore for an adhesive system with onset of reaction at relatively low temperatures and hence development of cohesion and network density in conjunction with high latency for storability at room temperature.

Although not absolutely necessary for the invention, it is also desirable if in the activation step the changes in thickness of the adhesive tape are as small as possible, but without disadvantages in relation to a sufficiently high degree of crosslinking under the conditions of short compression times;

and if the adhesive compositions on which the adhesive tape is based exhibit very good flow-on behaviour, so as to permit high bond strengths.

Desirable advantages are, moreover, high resistance to humidity/heat storage and excellent heat resistance under the prevailing application conditions, especially after short compression times. In order to meet the present and future requirements in the industry for environment and safety stipulations, the adhesive tape of the invention and the raw materials used ought to meet the relevant stipulations.

Solution

The object of the invention has been achieved by producing reactive adhesive compositions from a dispersion in which the curing agent is present in initially inactivated form and can be activated at moderate activation temperatures and/or in short activation times. A first subject of the invention, accordingly, are such dispersions.

The invention therefore relates to a dispersion comprising one or more protic solvents as dispersion medium and also comprising the following base components dispersed therein:
one or more matrix polymers,
one or more epoxide-group-containing compounds (also referred to hereinafter as epoxides or epoxy resins), and
at least one kind of a modified compound insoluble at least in the epoxides and preferably also in the other constituents of the dispersion, this compound being of the polyamine adduct type (compounds of the polyamine adduct type are also referred to for the purposes of this specification as "polyamine adducts"), where the at least one kind of the modified polyamine adduct is present in particulate form, with at least 90% of the particles having a particle size in the range from 0.1 to 10 μm as determined by laser diffractometry (measurement in an air medium with a dry sample),
and where the at least one modified polyamine adduct in particulate form is in dispersion.

With further advantage the average particle size (measured by means of light diffractometry) of the polyamine adduct particles is also in the range from 0.1 to 10 μm.

The polyamine adduct or adducts here take on (after activation; see later on below) the function of the curing agent for the epoxides. The polyamine adduct here may be the only curing agent or agents present, though it is also possible for curing agents of other types to be present as well. A preferred embodiment is that wherein the polyamine adduct(s) is (are) the only curing agents, and so no curing agents of other types are present.

The entirety of the aforesaid base components (matrix polymers, epoxides and all curing agents present, but without the dispersion medium or dispersion media) is also referred to in the context of this specification as the base composition, even when—as in the case of dispersed components that are present discretely—there is as yet no composition in the true chemical sense of the word.

As set out above, base components selected may in each case be a single representative of the stated classes of substances, or two or more representatives of this class of substance; the same applies to any additives present. When these classes of substances—matrix polymers, curing agents, epoxides, and optional additives—are elucidated in more detail hereinafter, they are referred to in each case in the plural form for linguistic reasons—for example, to the curing agents—although, of course, the form also includes that in which there is only one representative of the corresponding class of substance present—one curing agent, for example.

Compounds of the polyamine adduct type (polyamine adducts) are interpreted here as being the reaction products of a compound Z containing at least two functional groups and also of at least two (identical or different) compounds $Y^1$ and $Y^2$, which in turn each carry at least one amine group and also a further functional group, more particularly a further amine group, which are able to react with the functional group of the compound Z, of the general form

$Y^1$-Z-$Y^2$.

Suitable curing agents here include in particular the compounds in which the compounds $Y^1$ and $Y^2$ in the compound $Y^1$-Z-$Y^2$ have at least in each case at least one primary amino group —$NH_2$, though the invention is not confined necessarily to this variant. Primary amine groups are generally the most reactive; in principle, however, compounds Y having secondary and/or tertiary amine groups can also be used.

Polyamine adduct(s) selected are preferably polyamine-epoxy adduct(s) and/or polyamine-isocyanate adduct(s) (including polyamine-urea adducts), with particular preference being given in turn to the polyamine-epoxy adduct(s).

The matrix polymers in particular take on the function of a film former, as a support structure, so to speak, for the epoxy-curing agent system. By this means it is possible to construct self-supporting films, which may be present on a permanent carrier, but which may also be used as a film, more particularly a single-layer film, which is carrierless in the bonded state (known as adhesive transfer tapes).

The dispersion medium more particularly comprises to an extent of more than 90 wt % (based on the entirety of the dispersion media), more particularly exclusively (100%), water.

The invention relates advantageously to an aqueous dispersion.

A preparation of this kind allows the constituents needed for the adhesive strip to be provided in the form of a one-component system (understood here in relation to the form of presentation as a single preparation, not to the constituents included therein).

The curing agents in the system of the invention comprise at least partially, preferably completely, at least one polyamine adduct, more particularly at least one polyamine-epoxy adduct. The curing agents are used in a modified form, specifically such that the modification on the one hand—if not already an inherent property of the polyamine adduct in question—brings about insolubility in the epoxides, in particular in all other components of the dispersion, so that the polyamine adducts can be dispersed in a particulate form in the dispersion medium, without mixing with the other components. On the other hand, the modification brings about an inhibition of the reactivity of the curing agents in the unactivated state, and so the dispersed curing agents do not react directly in the dispersion or in the dried state, after being coated out as a layer, with the epoxides that are likewise present.

Only by activation are the reactive polyamine adducts released or converted into a form reactive for the epoxides, hence allowing the full-curing reaction to take place.

Where two or more curing agents of this kind (in particular two or more polyamine adducts) are present, it is in principle also possible for these agents to be activated under different activation conditions (more particularly at different activation temperatures), meaning that curing takes place in stages.

The modification—that is, passivation—of the curing agent substances may be accomplished in particular by blocking those functional groups in the respective curing agent that are relevant for the curing reaction. In this case it is possible to contemplate, for example, physical blocking (particularly by introduction of sterically hindering blocking groups, or shielding) and/or chemical blocking (in particular by introduction of reversible protective groups).

The at least one modified polyamine adduct, more particularly the at least one modified polyamine-epoxy adduct, is present advantageously in the form of particulate microcapsules.

A further subject of the invention are layers of adhesive composition which are obtainable by coating of the dispersion of the invention, in its base form or in one of its advantageous embodiments, onto a temporary carrier—that is, a carrier which can be removed again for application—or onto a permanent carrier—that is, a carrier which remains in the adhesive product in application—and subsequent drying, more particularly down to a residual dispersion medium content of not more than 5 wt %, based on the layer of adhesive composition. The drying temperature in this case is advantageously below the activation temperature (or below the lowest activation temperature of the two or more curing agents at different activation temperatures) so that in the latent reactive adhesive tape produced, the curing reaction has not yet commenced. The temperature difference to be observed in order to avoid the onset of activation during drying is dependent on the process parameters; frequently it has been found appropriate for the drying temperature to be at least 20° C. lower than the (lowermost) activation temperature.

In a latent reactive adhesive tape of this kind, the curing agents are also present in their modified (passivated) form. The curing agent or agents is or are only activated for the purpose of use.

In one advantageous embodiment of the invention the base composition is such that the base components are present in the dispersion in the following fractions:
 (A) 48 to 98.5 wt % of matrix polymer(s),
 (B) 1 to 44 wt % of epoxide(s),
 (C) 0.5 to 8 wt % of polyamine adduct(s).

The weight fractions here are based on the base composition, in other words on the entirety of the base components. The dispersion may be limited to these base components, thus having no other constituents; in accordance with the invention and advantageously, however, there may also be further components present, which must then be counted additively up to the entirety of the base composition.

With preference the amounts of curing agent used here are tailored to the amounts of epoxide present, in order to bring about an optimum profile and success of the curing reaction, particularly with regard to the requirements made of the ultimate adhesive product. With particular preference, the ratio of the epoxide groups capable of the curing reaction to the functional groups of the curing agents, stoichiometrically, is between 1:0.3 and 1:1.5, preferably between 1:0.5 and 1:0.9, as for example 1:1. The ratio referred to here is that arising theoretically from the quantities actually employed.

With the dispersions of the invention that have been described, success is achieved in producing latent reactive adhesive tapes which meet at least one, possibly—depending on configuration—two or three, or even all, of the following conditions:

high suitability for the field of tasks set out as being fundamental in this specification;

high bond strengths, corresponding to a push-out strength according to test A of at least 1.5 N/mm$^2$, preferably of at least 2.5 N/mm$^2$, very preferably of at least 3.5 N/mm$^2$;

high resistance to humid/heat storage of at least 1.3 N/mm$^2$, preferably at least 2.1 N/mm$^2$, very preferably at least 3.5 N/mm$^2$ (measured according to test B);

high bond strength at 80° C., more particularly of at least 0.4 N/mm$^2$, preferably at least 0.8 N/mm$^2$, very preferably at least 1.0 N/mm$^2$, measured according to test C;

high bond strength after a short storage time, more particularly of at least 0.4 N/mm$^2$, preferably at least 0.8 N/mm$^2$, very preferably at least 1.0 N/mm$^2$, measured according to test D;

the absence, or extremely minimal presence, of environmentally critical and health-critical substances; more particularly (substantially) no substances listed in the REACH ordinance as SVHCs (Substances of Very High Concern), (substantially) no volatile organic compounds (VOCs), (substantially) no halogens, (substantially) none of the substances considered critical in EU Directive 2011/65/EU (RoHS), and/or (substantially) no other hazardous substances.

Dispersion Media

The preparation for producing a latent reactive adhesive film is present in accordance with the invention in the form of a dispersion. The individual base components and optionally adjuvant components are in dispersion in a dispersion medium or in a mixture of two or more dispersion media.

In accordance with the invention, presentation as a dispersion allows the individual components—including in particular the epoxide component in the presence of the modified curing agents—to be brought together and coated out in the form of a film, without a curing reaction occurring at this stage.

The dispersion medium, or—where there are two or more dispersion media or a mixture of dispersion media present—the dispersion media (referred to below as "the dispersion media", also embracing the case of a single dispersion medium) are selected with particular preference such that they can be removed entirely or at least largely from the system at temperatures below the (lowest) activation temperature of the curing agents, especially after the dispersion has been coated out as a film or as a layer. This may be done by selecting dispersion media which evaporate to a large extent even in temperature ranges below the (lowest) activation temperature of the curing agents, and/or which can be evaporated by a suitable choice of the ambient conditions (especially pressure and temperature) in such temperature ranges.

In the special case of the invention, where two or more curing agents are present, it is also possible to select drying temperatures which lie above the activation temperatures of one or more of the curing agents, if partial curing is to take place during the drying process itself. Even in this case, however, the essential part of the curing reaction will take place in principle following application between the substrates to be bonded, with the consequence that immediately after drying there are at any rate substantial amounts of unreacted curing agent present in the system, especially amounts of those curing agents whose activation temperature is above the drying temperature.

For the partial preliminary curing, it is possible, for example, to use curing agents of low reactivity.

Typically selected as dispersion media are liquid substances which can also be used as solvents for other substances. Use as solvents, indeed, is the more frequent end use of such substances. The liquids in question are therefore commonly referred to in the prior art as solvents. Where the term "solvent" is used below, it is based on a general designation of this kind, and is not intended to mean that the liquid in question, in the context of the dispersions presently described, necessarily has not only the dispersing effect but also a dissolution effect on some or all of the constituents of the dispersion, unless specifically indicated otherwise in an individual case.

In principle it is possible to select as dispersion media those solvents in which not only the curing component but also all others, or at least some of the other components, dissolve, while the curing component is insoluble therein and is present in dispersion. Solvents not preferred as dispersion media are aprotic-polar solvents. Aprotic-apolar solvents—such as benzine, hexane or toluene, for example—meet these requirements more effectively and are therefore preferred to the aprotic-polar solvents.

In accordance with the invention, however, there is particular advantage in dispersing—and not dissolving—as many as possible of the constituents, and preferably, indeed, all of the constituents, of the preparation. By this means it is possible to achieve adhesive films which have the requisite properties and which have particularly good latent reactivity. The dispersion media should therefore be selected more particularly such that only a small part, preferably none, of the dispersed components dissolves therein. As far as possible, the dispersion media selected ought also not to act as solubilizers of the components with one another (the dispersion media selected are therefore preferably not to promote the dissolution of one or more of the components in one or more of the other components).

Having shown themselves to be greatly preferred in accordance with invention for producing the dispersion of the invention are protic solvents—such as alcohols, carboxylic acids and the like, for example—since they dissolve little or even none of the components employed. They can be used in accordance with the invention as the sole dispersion medium or as a dispersion medium in a mixture with further dispersion media, especially media that are likewise protic. However, a large number of protic solvents display a tendency to interact and/or react with constituents of the preparation of the invention—such as with the epoxides, for instance.

The most preferred dispersion medium is therefore water, either—as a very preferred procedure—as sole dispersion medium, or in a mixture with one or more other dispersion media, which more particularly are likewise protic.

If the dispersion medium used comprises a mixture of water and one or more other dispersion media, especially protic dispersion media, then the water fraction of this dispersion medium mixture is preferably 90 wt % or more.

The fraction of dispersion medium or media in the dispersion—that is, the ratio of dispersion media to dispersed components—can in principle be selected freely and adapted to the requirements in relation to the processing conditions.

In particular in relation to a favourable viscosity for coating on temporary or permanent carriers when producing adhesive films, it has proved to be advantageous if the fraction of dispersion media in the dispersion is between 20 and 90 wt %, preferably between 40 and 75 wt %.

If desired, before being coated in order to produce the adhesive film, the dispersion can be concentrated—or possibly, alternatively, diluted—to a desired solids: dispersion medium ratio—and hence to a desired viscosity—in order to optimize the processing conditions, in relation, for example, to the uniformity of the layer to be produced. The addition of thickening agents as well (also referred to as "thickeners") can be utilized in order to adjust the viscosity of the dispersion. It has proved to be favourable, particularly for the purpose of coating out onto a carrier, if the dispersion is adjusted to a state of yogurt-like thixotropy.

Dispersions of the invention composed of the respective constituents may be produced by the various polymerization processes according to the prior art (as for example by emulsion polymerization, suspension polymerization, also preparation and mixing of discrete dispersions of individual constituents or in each case two or more of the constituents). Polymer dispersions may be prepared, for example, by dispersing the polymer, by dispersing precursors of the polymer (prepolymers), or else by introducing the parent monomers into the dispersion medium and then carrying out polymerization in dispersion. Dispersions of polymers, however, are also available commercially in diverse forms and composed of different polymers from different manufacturers, and may be used as a basis for the dispersion of the invention.

Film Formers/Matrix Polymers

The adhesive films of the invention consist in principle of a matrix, also referred to below as polymeric film former matrix, which comprises the reactive components—epoxides and curing agents. The object of this matrix is to form a framework, more particularly an inert framework, for the other constituents of the latent reactive adhesive film, so that these constituents are present not in liquid form but instead incorporated within a film or a foil.

"Inert" in this context means that under appropriately selected conditions (e.g. at sufficiently low temperatures) the reactive monomers and/or reactive resins undergo substantially no reaction with the polymeric film former matrix.

In the dispersion of the invention, for producing the latent reactive adhesive film, there are one or more matrix polymers, also referred to as film formers or film former polymers, in dispersed form.

Matrix polymer components used may in principle be homopolymers, copolymers, mixtures of homopolymers, mixtures of copolymers, and mixtures of homopolymers with copolymers.

Especially suitable as matrix polymers for reactive adhesive compositions of the invention are thermoplastic materials, elastomers and thermoplastic elastomers.

Matrix polymers selected preferably are those polymers whose respective softening point is in the range from 40 to 120° C., more particularly in the range from 50 to 100° C. Softening points in this context are determined in accordance with ASTM E28-14.

Examples of suitable thermoplastic polymers are semicrystalline polyolefins and ethylene-vinyl acetate copolymers (EVA). Preferred polyolefins are prepared from ethylene, propylene, butylene and/or hexylene—in each case the pure monomers may be polymerized or mixtures of the stated monomers may be copolymerized. With great advantage it is possible to use elastomers as matrix polymers. Examples would include rubber or synthetic rubber, known in aqueous form as latex, as starting material for the adhesive compositions. There are diverse possibilities for variation here, whether for rubbers from the group of the natural rubbers or the synthetic rubbers, or from any desired fraction of natural rubbers and/or synthetic rubbers.

Highly advantageous are aqueous dispersions of nitrile rubbers (Litex®), especially those polymerized hot, and those having an acrylonitrile content of between 15% and 50%, preferably between 30% and 45%, and a Mooney viscosity (ML 1+4, 100° C.; DIN 53523) of between 30 and 110, preferably between 60 and 90. Also advantageous are aqueous dispersions of thermoplastic elastomers, and especially here of block copolymers, star copolymers and/or graft copolymers. Specific examples are styrene-butadiene block copolymers (SBS), styrene-isoprene block copolymers (SIS), styrene-(isoprene/butadiene) block copolymers (SIBS) and (partly) hydrogenated variants such as styrene-(ethylene/butylene) block copolymers (SEBS), styrene-(ethylene/propylene) block copolymers (SEPS, SEEPS), styrene-(butylene/butyl) block copolymers (SBBS), styrene-isobutylene block copolymers (SiBS), and polymethyl methacrylate-polyacrylate block copolymers. These block copolymers may be used as a linear or multi-armed structure, as diblock copolymer, triblock copolymer or multiblock copolymer, and also as mixtures of different kinds.

Further advantageous examples of thermoplastic elastomers are thermoplastic polyurethanes (TPUs). These polymers can be used outstandingly as matrix polymer in accordance with the invention. A single thermoplastic polyurethane may in this case be used as exclusive matrix polymer; a mixture of two or more thermoplastic polyurethanes may be used; or a mixture of one or more thermoplastic polyurethanes with one or more other matrix polymers may be used. Polyurethanes are chemically and/or physically crosslinked polymers which are typically synthesized from polyols and isocyanates and which comprise soft and hard segments. The soft segments consist for example of polyesters, polyethers and polycarbonates, in each case preferably aliphatic in nature for the purposes of this invention, with hard segments of polyisocyanate. Depending on the nature of the individual components and the proportions in which they are used, it is possible to obtain materials which can be employed advantageously for the purposes of this invention. Additionally suitable for use as thermoplastic elastomers from aqueous dispersion for matrix polymers (A) are polyolefin-based thermoplastic elastomers, polyetherester elastomers, polyamides such as polyesteramides, polyetheresteramides, polycarbonateesteramides and polyether-block-amides.

The matrix polymers are selected more particularly such that in combination with the other constituents of the formulation they allow access to adhesives which are advantageous in relation to processing qualities at the premises of the adhesive tape manufacturer on the one hand and adhesive tape user on the other. This relates in particular to technical adhesive properties and in relation to further improvement in the dimensional stability of the adhesive films in relation to the presentation form of the adhesive product, and to the oozing characteristics in the hot lamination process, to name just a few particularly important requirements.

Epoxides

Adhesive compositions of the invention comprise at least one kind of an epoxide-group-containing compound (also referred to in the context of this specification as "epoxide" or "epoxy resin").

Very preferably, epoxides selected comprise one or more epoxide-group-containing compounds which possess an epoxide equivalent (EE) of 150 to 1500 g/mol, more preferably of 170 to 700 g/mol.

The epoxide equivalent is defined, in accordance with the definition in DIN EN ISO 3001:1999-11 (especially 2.1: Epoxide Equivalent therein), such that it corresponds to the mass in grams of oligomeric or polymeric compound containing epoxide groups that contains 1 mole of epoxide group.

The definition for epoxide equivalent in the present specification is used accordingly for all oligomeric and polymeric compounds containing epoxide groups—in the sense of the term "resin" as stated in DIN EN ISO 3001:1999-11.

Where two or more oligomeric and polymeric compounds contain epoxide groups, the epoxide equivalent can be stated correspondingly as a whole for the mixture of the oligomeric and polymeric compounds containing epoxide groups, by stating the mass in grams of the mixture of epoxide-group-containing compounds that contains 1 mole of epoxide groups.

The figure for the epoxide equivalent is stated in g/mol [grams of oligomeric and/or polymeric compound(s) containing epoxide groups/moles of epoxide groups].

It is of advantage, for the further processing of the dispersion to an adhesive film, to tailor viscosity and cohesion to one another. This can be done, for example, by using at least two epoxy resins, of which one is based on short macromolecules and one is based on long macromolecules, and/or if one epoxy resin is liquid and the other epoxy resin is solid or at least semi-solid.

The interplay between the reactivity of the epoxy resins, their chain length and/or their aggregate state is reflected in factors including the epoxide equivalent weight. In accordance with the invention, therefore, it is an advantage if the epoxides used comprise at least two epoxide-group-containing compounds, namely i) at least one epoxide-group-containing compound having an epoxide equivalent (EE) of 150 to 225 g/mol and at least one epoxide-group-containing compound having an epoxide equivalent (EE) of 230 to 400 g/mol, or ii) at least one epoxide-group-containing compound having an epoxide equivalent (EE) of 150 to 225 g/mol and at least one epoxide-group-containing compound having an epoxide equivalent (EE) of 400 to 1500 g/mol, or iii) at least one epoxide-group-containing compound having an epoxide equivalent (EE) of 230 to 400 g/mol and at least one epoxide-group-containing compound having an epoxide equivalent (EE) of 400 to 1500 g/mol, or iv) at least one epoxide-group-containing compound having an epoxide equivalent (EE) of 150 to 225 g/mol and at least one epoxide-group-containing compound having an epoxide equivalent (EE) of 230 to 400 g/mol and at least one epoxide-group-containing compound having an epoxide equivalent (EE) of 400 to 1500 g/mol.

Examples of epoxy resins which can be used as reactive resins for use in the present invention are polyglycidyl ethers based on polyphenols, such as bisphenol A, bisphenol F, catechol, resorcinol, etc., or on polyalcohols such as glycerol, polyethylene glycol, etc., and epichlorohydrin. Also glycidyl ether esters, which are obtained by reacting hydroxycarboxylic acids and epichlorohydrin. Moreover, polyglycidyl esters, which are obtained by reacting polycarboxylic acids, such as phthalic or terephthalic acid, and epichlorohydrin. Epoxidized phenol-novolac resins, epoxidized cresol-novolac resins, epoxidized polyolefins, acyclic epoxy resins and other modified epoxy resins, and also mixtures or aqueous dispersions of epoxy resins, can likewise be used for the adhesive composition of the invention. However, the present invention is not confined to these.

Used preferentially for the specific adhesive compositions of the invention are epoxy resins having a very low halogen content (<1000 ppm, preferably indeed <100 ppm; all figures for halogen contents are based on the determination by ion chromatography according to EN 14582:2007), especially with respect to chlorine and bromine.

Curing Agents

Adhesive compositions of the invention comprise at least one kind of a curing agent. The curing agents are selected such that the resulting formulation has an extremely pronounced latency in its reactivity. "Latency" in the sense of the present invention means that the adhesive system or the adhesive film based thereon exhibits substantially no curing reaction or no curing reaction at all under predefined conditions—such as, for example, at room temperature or else at slightly elevated temperatures such as 35° C. or even 50° C.—without exceedance of the activation energy. In this sense, in the context of this specification, the phrase "latent reactive adhesive tapes" is also used in the context of the corresponding adhesive films after drying of the layer or layers of adhesive composition.

Reaction takes place in response to an activating impulse which may be triggered under defined activation conditions—in particular by elevated temperature. A characteristic variable for describing the latency is therefore the stated activation energy and, since this energy is introduced generally in the form of heat, the corresponding activation temperature. For the curing agents used in accordance with the invention, the activation temperature is in particular at least 60° C., preferably at least 75° C., very preferably at least 90° C. Advantageously the activation temperature is at most 150° C., preferably at most 120° C.

The figures for the activation energy here are based on the determination by DSC measurement; see the "Reference methods" section, Ref. 2.

Activation is accomplished by converting the curing agent from its modified form into a reactive form, in particular into its base form (unmodified form). This reactive form is capable of entering into reaction with the epoxide groups and so causing the curing of the adhesive composition.

In one very preferred procedure the polyamine adducts are used in microencapsulated form, more particularly in the form of particulate microcapsules. At least 90 wt % of the particulate microcapsules, advantageously, possess a particle size in the range from 0.1 to 10 μm as determined by laser diffractometry, and with further advantage the average particle size of the microcapsules as well (determined by means of light diffractometry) is within this range (0.1 to 10 μm).

Microencapsulation is a technique with which solids, liquids or gases in small portions are surrounded with a shell (capsule shell) and so passivated for example in relation to a particular active property. In the case of the present microencapsulation, the curing agent is enveloped with a shell material. This produces a substantially spherical capsule. Shell in the context of the present specification refers to all encasements whose effect is to provide the core material with adequate passivation. The shell may be but need not necessarily be a closed shell (capsule shell), although such a closed form represents a preferred embodiment. Also suitable for use in accordance with the invention are those modified systems which have more or less perforate encasements, net-like structures or even just individual quantities of the shell material that are arranged locally in each case at the periphery of the core; the corresponding modifications are then to be interpreted as capsule shell within the meaning of the present invention. Indeed, encapsulations of this kind may also be suitable for providing the curing agent (core) material with a sufficient protective effect, which is to be eliminated only on thermal activation of the fully shaped and applied adhesive tape.

Shell fracture—activation; see above—generally produces complete release of the core material—the curing agent—in a short time ("burst"), the core material then being available for the curing reaction. Through the choice of the shell material, however, it is also possible to produce slow or extremely slow release. This allows the kinetics of the curing reaction to be influenced in a targeted way.

In principle, the shell material of the microcapsules is not subject to any particular restrictions. Very preferably, however, in view of the later thermal activation of the curing agents on the one hand, with activation, in particular with exposure to heat beyond the activation temperature, the shell material ought to be removable, meltable or the like, and on the other hand ought to exhibit a high stabilization effect under non-activation conditions, in order for example to ensure high storage stability of the latent reactive adhesive tapes of the invention. When polymeric shell materials are used, shell fracture may be accomplished in particular by melting of the shell. The melting point of very suitable capsulate materials is situated for example in the range from 60 to 180° C.

Advantageous materials for this purpose are polymer compounds, examples being polyurethane compounds, polyurea compounds, polyurethane-polyurea copolymer compounds, polyvinyl compounds, melamine compounds, epoxy resins an/or phenolic resins, especially in each case those having the melting points within the aforesaid range.

Activation temperatures advantageous for the purposes of the present invention, in other words those temperatures at which the amine adduct compounds are released and/or go into solution, are at least 60° C., preferably at least 75° C., more preferably at least 90° C. Latent reactive adhesive tapes which can be activated in this temperature range—and therefore the activation of the curing reaction—are advantageous, for example, for adhesive bonds in which thermally sensitive substrates are not to suffer thermal damage during bonding. The cure time selected is in general between a few seconds through to several minutes, depending on the temperature at curing and on the reactivity of the curing agents used. At the curing stage, moreover, the latent reactive adhesive tape may be placed under pressure, advantageously.

In the case of substrates which are more thermally stable, the bonds may also be produced by means of higher temperatures, for example at at least 120° C., at least 150° C., at least 180° C., at least 200° C. or even higher. For certain requirements, indeed, temperatures of such levels are preferred. The cure time in this case may be, for example, 10 s, for example 30 s, for example 60 s, for example 120 s, for example 240 s, for example 5 min or for example 10 min, although much higher cure times (such as 15 min, for example, or 30 min, for example, or more) are not ruled out.

The curing agent used comprises at least one kind of a modified compound of the polyamine adduct type; see also above. In accordance with the invention, modified polyamine adducts form at least part of the curing agents used, and with preference the curing agents used are exclusively polyamine adducts.

Polyamine adducts selected advantageously comprise in part, more particularly exclusively, one or more polyamine-epoxy adducts and/or one or more polyamine-isocyanate adducts. For the purposes of the present invention, polyamine-urea adducts are included among the polyamine-isocyanate adducts.

Preferred for use as curing agents are at least partly modified polyamine-epoxy adducts, these being the reaction products of amine compounds with epoxide compounds. The modification has the effect—as mentioned at the outset—of ensuring the passivation of the curing agent in the latent state.

Having emerged as being particularly outstanding are, for instance, polyamine-epoxy adducts with linear aliphatic polyamines and polyamine-epoxy adducts with cycloaliphatic polyamines, the choice of the curing agent being outstandingly utilizable for optimizing the adhesive compositions for specific profiles of properties. In this regard see also the observations concerning the experimental results.

An example of a linear aliphatic polyamine-epoxy adduct is the reaction product of bisphenol A and N-(2-aminoethyl)-1,2-ethanediamine, which in its presentation form is present partially in the presence of epichlorohydrin. This reaction product can be used as a single curing agent component, or else in combination with other curing agents, especially those that are likewise in accordance with the invention.

In one preferred embodiment of the invention, the polyamine-epoxy adduct used comprises at least partially the reaction product of bisphenol A diglycidyl ether and (2-aminoethyl)cyclohexanamine. In a particularly preferred embodiment of the invention, reaction product of bisphenol A diglycidyl ether and (2-aminoethyl)cyclohexanamine (in modified form) is used as the sole curing agent component. The parent (2-aminoethyl)cyclohexylamine here may in principle be 4-(2-aminoethyl)cyclohexylamine and/or 3-(2-aminoethyl)cyclohexylamine and/or 2-(2-aminoethyl)cyclohexylamine.

The reaction product of bisphenol A diglycidyl ether and (2-aminoethyl)cyclohexanamine is taken in particular to encompass compounds which can be read under the following structural formula:

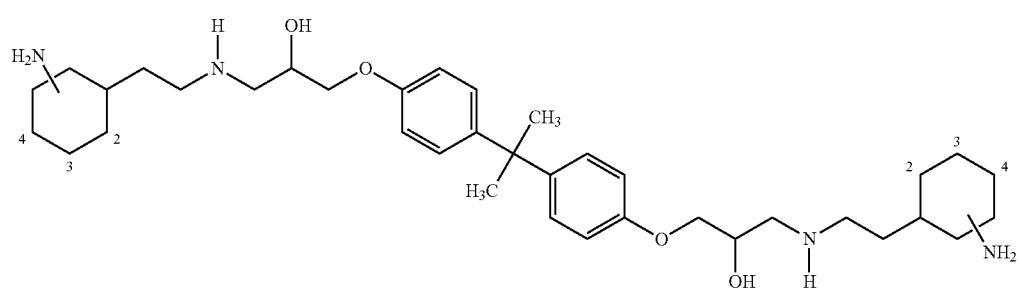

formula (I)

where the amino groups may each be in position 2, 3 or 4 (compare the structural formula) on the terminal six-membered rings.

The reaction product of bisphenol A diglycidyl ether and (2-aminoethyl)cyclohexanamine here may be present, for example, in the pure form of the respective symmetrical compounds, i.e.

for example in pure form of the compound (formula Ia)

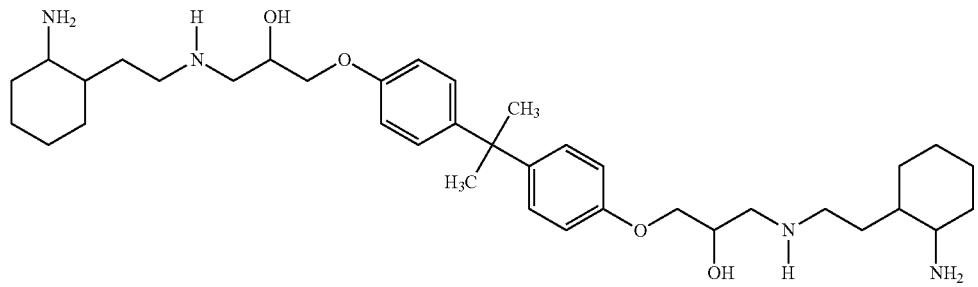 [SMILES: CC(C)(c1ccc(OCC(O)CNCCC2CCCCC2N)cc1)c1ccc(OCC(O)CNCCC2CCCCC2N)cc1]

or for example in the pure form of the compound (formula Ib)

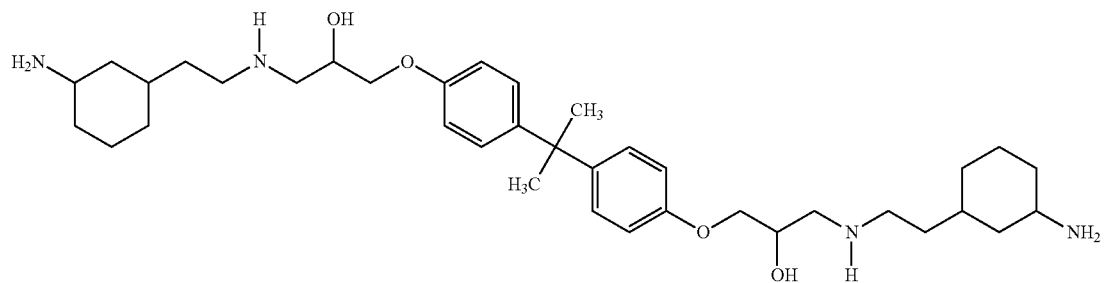 [SMILES: CC(C)(c1ccc(OCC(O)CNCCC2CCCC(N)C2)cc1)c1ccc(OCC(O)CNCCC2CCCC(N)C2)cc1]

or for example in the pure form of the compound (formula Ic)

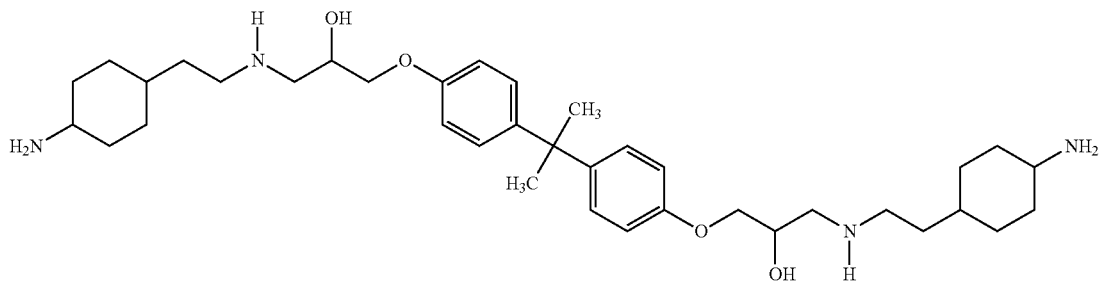 [SMILES: CC(C)(c1ccc(OCC(O)CNCCC2CCC(N)CC2)cc1)c1ccc(OCC(O)CNCCC2CCC(N)CC2)cc1]

or for example as an isomer mixture of two or three of the aforesaid compounds [formula (Ia) and formula (Ib); or formula (Ia) and formula (Ic); or formula (Ib) and formula (Ic); or formula (Ia) and formula (Ib) and formula (Ic)], or, for example, as an isomer mixture of compounds on which the amino groups of the two terminal six-membered rings are located at different positions (asymmetric compounds), or, for example, as an isomer mixture of symmetrical and asymmetrical compounds corresponding to the structural formula above.

One very preferred procedure uses the polyamine-epoxy adduct and/or the polyamine-epoxy adducts—more particularly the reaction product of bisphenol A diglycidyl ether and (2-aminoethyl)cyclohexanamine—in microencapsulated form, more particularly in the form of particulate microcapsules, very preferably in the particle sizes specified above for microcapsules used in accordance with the invention.

Preferred melting points for the shell of the microencapsulated polyamine-epoxy adducts are within the above-specified ranges for activation temperatures, and here in particular in the range from 60 to 95° C., more preferably in the range from 75 to 85° C.

Preferred particle sizes of the microcapsules are—as mentioned at the outset—in the range from 0.1 to 10 μm, preferably in the range from 1 to 7 μm (reference: measurement by laser diffractometry).

The microcapsules are preferably formed in each case of
a core comprising the reaction product with bisphenol A diglycidyl ether and (2-aminoethyl)cyclohexanamine, preferably consisting of this reaction product, and
a shell composed of a material having a melting point of at least 60° C., preferably in the range from 65 to 95° C., more preferably in the range from 75 to 85° C.

For the shell material, reference is made to the more detailed observations in this regard above.

Examples of the curing agents of this type are reaction products of amine compounds with epoxide compounds (amine-epoxy adduct), reaction products of amine compounds and isocyanate compounds or urea compounds (curing agents of the urea adduct type) and modified products obtained by treating the surface of these curing agents with isocyanate compounds or acid compounds (fatty acids). Reference may also be made in this context to the specifications DE 695 13 309 T2 and WO 2009/060576 A and also the curing agents specified therein.

Commercially available examples of curing agents for amine-epoxy adducts would include AJICURE PN-23, PN23J, PN-H; Adeka Hardener EH4346S, 4357S, 4356S; Ancamine 2014AS, 2014FG.

Examples that may be mentioned of curing agents of the urea adduct type would include Fujicure FXR-1000, FXR-1030.

Examples of curing agents having specified modification include Adeka EH4339S, 4370S, 4380S, 5011; Ancamine 2337. In this regard, see also the curing agents specified in U.S. Pat. No. 8,124,232 B.

The present invention, however, is not confined to these.

Further Optional Constituents

The adhesive compositions of the invention may optionally be admixed with further constituents which produce desired adjustments to the properties of the adhesive system, such as, for example, fillers, dyes, adhesion promoters, defoamers, thickeners, tackifier resins, non-epoxide reactive resins and/or further additives. Individual adjuvants that are particularly preferred are addressed in more detail later on below. Optional constituents are added in particular to the dispersion of the invention itself, from which the adhesive composition—especially in the form of an adhesive film—is obtained. The optional constituents may be present in the dispersion themselves in the form of discrete disperse phases (for example particulate, as drops or the like), and/or they may be miscible with one or more of the base components, more particularly with the matrix polymers and/or the epoxides, and may form joint disperse phases together with these components.

Where it is said hereinafter that the optional constituents have been admixed to the adhesive compositions, this refers, correspondingly, to the preparation of the dispersion of the invention, from which the adhesive compositions of the invention are obtainable.

Optional constituents may be admixed to the adhesive composition in principle in any desired quantities, adapted to the particular requirements and desires (and for that purpose first introduced into the dispersion). As set out in more detail below, however, certain amounts are advantageous for certain optional constituents. Figures for the preferred amounts of optional constituents are given hereinafter in parts by weight per 100 parts by weight of base composition (without dispersion media; see above).

Optional constituents may be added advantageously in technically customary quantities, as for example up to about 100 parts by weight per 100 parts by weight of base composition.

Examples that may be given in this context include tackifier resins (in particular up to 100 parts by weight, preferably up to 35 parts by weight) and further adjuvants or additives (typically up to 10 parts by weight), based in each case on 100 parts by weight of the base composition.

Tackifier Resins

Hence it may in particular be desirable to admix the adhesive compositions with tackifier resins. Tackifier resins are, in particular, oligomeric to relatively short-chain polymeric substances or substance mixtures, which are usually amorphous in nature and customarily have a softening range. The molar mass (number average $M_n$; see Ref. 4) of resins is generally not above 10 000 g/mol. Tackifier resins—also called tackifying resins—are, in particular, substances which are compatible, particularly at elevated temperature, with the matrix polymers, or at least with part of the matrix polymers, and which have a positive influence on the thermomechanical properties of the polymers or polymer mixtures in which they are included; this positive influence relates in particular to the capacity of the polymers or polymer mixtures to wet surfaces, and to their fluidity. Generally speaking, admixing tackifier resins leads to an increase in the glass transition temperature of the polymer mixtures and to a lowering of their modulus. Tackifier resins may therefore serve, for example, to increase the tack, wetting properties, adhesion properties and/or viscosity in particular of the adhesive composition which has been freed from the dispersion medium.

Tackifier resins in the sense of the present specification are, in particular, those polymeric (including oligomeric) substances and substance mixtures which have softening temperatures (ASTM E28-14) of greater than 25° C., more particularly of greater than 80° C., more particularly (in a narrower definition) also possessing a number-average molar mass of not more than 10 000 g/mol.

The adhesive composition of the invention optionally comprises one or more kinds of a tackifier resin, advantageously those which are compatible with the epoxy resin and/or with the matrix polymer and/or with the curing agent system.

Tackifier resins which can be used in the adhesive composition are, for example, partially or fully hydrogenated or disproportionated resins based on rosin and rosin derivatives, indene-coumarone resins, terpene-phenolic resins, phenolic resins, hydrogenated polymers of dicyclopentadiene, partially, selectively or fully hydrogenated hydrocarbon resins based on C5, C5/C9 or C9 monomer streams, polyterpene resins based on α-pinene and/or ß-pinene and/or δ-limonene, or hydrogenated polymers of preferably pure C8 and C9 aromatics. Aforesaid tackifier resins may be used either alone or in a mixture.

To ensure high ageing stability and UV stability, hydrogenated resins having a degree of hydrogenation of at least 90%, preferably of at least 95%, are preferred.

Furthermore, especially in combination with non-polar film formers, preference is given to non-polar resins having a DACP (diacetone alcohol cloud point) of more than 30° C. and an MMAP (mixed methylcylohexane aniline point) of greater than 50° C., more particularly having a DACP of more than 37° C. and an MMAP of greater than 60° C. The DACP and the MMAP each indicate the solubility in a particular solvent mixture. Regarding the definition and determination of the DACP and MMAP, reference may be made to C. Donker, PSTC Annual Technical Proceedings, pp. 149-164, May 2001. For MMAP, ASTM C611 may also be consulted.

As further optional constituents it is possible, as additives to the adhesive composition, to add customary adjuvants such as ageing inhibitors (antiozonants, antioxidants, light stabilizers, etc.).

Possible additives to the adhesive system include the following:
  primary antioxidants such as, for example, sterically hindered phenols
  secondary antioxidants such as, for example, phosphites or thioethers
  process stabilizers such as, for example, C radical scavengers
  light stabilizers such as, for example, UV absorbers or sterically hindered amines
  processing assistants such as additives with rheological activity (e.g. thickeners)
  wetting additives
  expandants such as chemical foaming agents and/or expanded or expandable microballoons and/or hollow spheres such as hollow glass spheres
  adhesion promoters
  compatibilizers
  colourants/pigments The adjuvants or additives are not mandatory; an advantage of the adhesive composition of the invention is that it exhibits its advantageous properties even without the addition of additional additives individually or in any desired combination. In specific cases, it may nevertheless be advantageous and desirable to adjust certain further properties of the adhesive composition by means of the addition of additives.

Thus, for example, it is possible to influence the transparency of the composition and its colour. Some formulations are optically clear, others opaque, others in turn coloured, black, white or grey.

Among the optional adjuvants or additives as well, the individuals selected are those which, before the initiation of the curing reaction, enter essentially into no reaction or in particular into no reaction at all, with epoxide functionalities, or which neither initiate nor catalyse reactions of the epoxide functionalities, or those for which reaction with epoxide functionalities is otherwise prevented.

Adhesion Promoters

In a preferred procedure, the adhesive compositions have been admixed with adhesion promoters. For the dispersion of the invention on which the adhesive compositions are based, it is useful if the adhesion promoter is present in the form of a discrete disperse phase; here as well, however, the adhesion promoters may alternatively take the form of a common disperse phase with the matrix polymers and/or with the epoxides.

In a preferred embodiment according to the invention, adhesion promoters may be used, for example, at up to 5 parts by weight per 100 parts by weight of the base composition.

Adhesion promoters which can be used to particularly good effect are silanes. Examples of silanes that can be used for the purposes of this invention, without wishing to impose any restriction, are methyltrimethoxysilane, methyltriethoxysilane, dimethyldimethoxysilane, dimethyldiethoxysilane, trimethylethoxysilane, ethyltrimethoxysilane, propyltrimethoxysilane, propyltriethoxysilane, isobutyltrimethoxysilane, isobutyltriethoxysilane, octyltrimethoxysilane, octyltriethoxysilane, isooctyltrimethoxysilane, isooctyltriethoxysilane, hexadecyltrimethoxysilane, hexadecyltriethoxysilane, octadecylmethyldimethoxysilane, phenyltrimethoxysilane, phenyltriethoxysilane, cyclohexylmethyldimethoxysilane, dicyclopentyldimethoxysilane.

One example of silyl-functionalized oligomers or polymers, which can be employed in accordance with the invention, is polyethylene glycol linked with a trimethoxysilane group.

Other examples of silanes which can be used and which carry at least one functionalization are vinyltrimethoxysilane, vinyltriethoxysilane, vinyltri(2-methoxyethoxy)silane, vinyltriisopropoxysilane, vinyldimethoxymethylsilane, vinyltriacetoxysilane, 3-glycidyloxypropyltrimethoxysilane, 3-glycidyloxypropyltriethoxysilane, 2-(3,4-epoxycyclohexyl)ethyltriethoxysilane, 3-glycidyloxypropyldiethoxymethylsilane, 3-methacryloyloxypropyltrimethoxysilane, 3-methacryloyloxypropyltriethoxysilane, 3-methacryloyloxypropyltriisopropoxysilane, 3-methacryloyloxypropyldimethoxymethylsilane, 3-methacryloyloxypropyldiethoxymethylsilane, 3-chloropropyltrimethoxysilane, 3-chloropropyltriethoxysilane, 3-ureidopropyltrimethoxysilane, 3-ureidopropyltriethoxysilane, 2-hydroxy-4-(3-triethoxysilylpropoxy)benzophenone, 4-(3'-chlorodimethylsilylpropoxy)benzophenone.

Of these, 3-glycidyloxypropyltriethoxysilane has emerged as a particularly preferred adhesion promoter, and can be used as sole adhesion promoter or else in combination with other adhesion promoters. Another advantage of this compound is that it acts as a defoamer in the dispersion process.

Fillers

Where particulate fillers are employed, they may be of preferably spherical, rodlet-shaped or platelet-shaped structure. Separated particles, often also called primary particles, are in accordance with the invention, as are aggregates formed of a plurality of primary particles. Such systems often display a fractal superstructure. If the particles are formed of crystallites, then the primary particle morphology is dependent on the nature of the crystal lattice. Platelet-shaped systems may also take the form of stacked layers. If fillers are employed, the amount is typically up to 15 wt %.

In one advantageous embodiment of this invention, one kind of filler in the adhesive formulation is present substantially in the form of singular spherical particles. The particle diameters in that case have values of less than 500 nm, preferably of less than 100 nm, very preferably of less than 25 nm. In a further advantageous configuration of this invention, the at least one functionalized kind of filler is present in the adhesive composition substantially in the form of singular platelet-shaped particles. The layer thickness of such platelets in that case has values of preferably less than 10 nm, and a greatest diameter of preferably less than 1000 nm. In a further advantageous configuration of this invention, the at least one kind of filler is present in the adhesive composition substantially in the form of singular rodlet-shaped particles. In that case these rodlets have a diameter of less than 100 nm and a length of less than 15 μm. The rodlets may also be curved and/or flexible. It is further possible advantageously in the sense of this invention for the at least one kind of filler to be present in the adhesive composition in the form of primary particle aggregates. These aggregates have a radius of gyration (to be understood in analogy to the polymer-associated term "radius of gyration") of less than 1000 nm, preferably of less than 250 nm. Particular preference is given to the use, for the purposes of this invention, of those particulate fillers whose spatial extent in at least one direction is less than 250 nm, preferably less than 100 nm, very preferably less than 50 nm. It is also possible in the sense of this invention to use combinations of the aforesaid types of filler. Typical and further classes of compound for fillers, advantageous in accordance with the invention, are oxides of inorganic type—especially metal oxides and/or semi-metal oxides—, salts of the alkaline earth metals, and also silicate-based minerals, especially clay minerals and clays. The amorphous or crystalline metal oxides which can be used in accordance with the invention include, for example, silicon dioxide, aluminium oxide, titanium dioxide, zirconium dioxide and zinc oxide. Further systems which may likewise be used in accordance with the invention are familiar to the skilled person. Alkaline earth metal salts include, for example, carbonates, sulfates, hydroxides, phosphates and hydrogen phosphates of magnesium, of calcium, of strontium and of barium. The clays and clay minerals which can be used in accordance with the invention include, in particular, silicatic systems such as serpentines, kaolins, talc, pyrophyllite, smectites such as, in particular, montmorillonite, vermiculites, illites, micas, brittle micas, chlorites, sepiolite and palygorskite. Moreover, synthetic clay minerals such as hectorites and also their related systems such as, for example, Laponite® from Laporte, and fluorohectorites and also their related systems such as Somasif® from Co-Op, for example, may be used in accordance with the invention.

Particulate fillers may have surface functionalization and may have been made hydrophobic or hydrophilic. Particularly advantageous is functionalization by means of epoxide-containing compounds, which are able to participate in the curing reaction.

The fillers are not mandatory; the adhesive composition also works without fillers having been added individually or in any desired combination. Among the optional fillers as well, the individuals selected are those which, before the initiation of the curing reaction, enter essentially into no reaction or in particular into no reaction at all, with epoxide functionalities, or which neither initiate nor catalyse the reactions of the epoxide functionalities, or those for which reaction with epoxide functionalities is otherwise prevented.

Adhesive Compositions Obtainable from the Dispersion of the Invention

By removing the dispersion medium, it is possible, from the dispersions of the invention, to produce adhesive compositions with latent reactivity, configured more particularly in layer form as adhesive tapes. For further details of the adhesive tapes, see later on below. This can be done, for example, by drying to residual dispersion medium levels of not more than 5 wt % (based on the adhesive composition). The observations below relate to the adhesive compositions freed accordingly from the dispersion medium.

With preference the curable adhesion composition in the uncured state has a first glass transition temperature, which lies below the temperature at which the adhesively bonded assembly, consisting of reactive adhesive film and substrates to be bonded, is produced by lamination, and so the formulation under the laminating conditions, under pressure within a defined period of time, permits sufficient wetting on the substrate/substrates. The temperature utilized for lamination is referred to in the context of this invention as "laminating temperature". The temperature difference between the laminating temperature and glass transition temperature is preferably at least 40° C., more particularly at least 70° C. or even at least 100° C., with the laminating temperature lying above the glass transition temperature. The laminating temperature is advantageously between 40° C. and 110° C., more particularly between 50° C. and 90° C. It lies below the activation temperature, this being the temperature at which the curing of the curable adhesive composition is initiated. The difference between laminating temperature and activation temperature is advantageously at least 20° C., more particularly at least 40° C.

With further advantage the epoxy resin itself as well in the uncured state has a first glass transition temperature which lies below the temperature at which the adhesively bonded assembly, consisting of adhesive film and substrates to be bonded, is produced by lamination. The temperature difference between the laminating temperature and glass transition temperature of the uncured epoxy resin in this case is preferably at least 20° C., more particularly at least 40° C., with the laminating temperature lying above the glass transition temperature.

The title of "cured system" or "cured adhesive" denotes, in the context of this invention, that the adhesive composition with the epoxy resin (B) has been activated by exposure to the curing agent component and to elevated temperature as a further stimulus and that a reaction has taken place involving the functional groups of the epoxy resin (B). It is not necessary for all of the functional groups able to participate chemically in the curing reaction to have undergone reaction. Instead, a conversion of 50% of the functional groups may already provide a sufficiently high glass transition temperature and be very suitable indeed for the bonding application. A conversion of 50% is given here by way of example. The statement made may also be valid for higher conversions such as 60%, 70%, 80%, 90% or 100%, or, indeed, for lower conversions such as 40% or 30%. The aim here is that the bonding properties after curing has taken place are appropriate for the application. Preferred properties and values realized in the experiments are indicated, in this regard, in Tables 2 and 3, which are given later on.

The adhesive composition may exhibit pressure-sensitive adhesion under standard conditions (23° C., 50% relative atmospheric humidity). In that case in the uncured state it has a glass transition temperature of below 0° C., preferably of at most −25° C. This characteristic simplifies converting operations such as the pre-dimensioning of adhesive tape sections for the subsequent bonding operation, or else laminating steps in the production of adhesive product constructions and component bonding. In the laminating operation in this case it is not absolutely necessary to work with elevated temperature; instead, lamination may take place at room temperature, since sufficient contact between adhesive composition and the substrates to be bonded can be realized simply by way of the lamination pressure.

The term "pressure-sensitive adhesive composition" or "pressure-sensitively adhesive composition" (PSA for "pressure sensitive adhesives") is understood, as usual, to refer to those viscoelastic, polymeric compositions which at the application temperature (unless otherwise defined, at room temperature, i.e. 23° C.), and possibly through appropriate additization with further components, such as, for example, tackifier resins (D1), are durably tacky and permanently adhesive and attach on contact to a multiplicity of surfaces, more particularly attaching immediately (exhibiting what is referred to as "tack" [alternatively referred to as touch-stickiness]). They are capable even at the temperature of application, without activation by solvent or by heat, though optionally under the influence of a greater or lesser pressure, of sufficiently wetting a substrate to be bonded, so that interactions sufficient for attachment are able to develop between the composition and the substrate.

Under standard conditions (23° C., 50% relative atmospheric humidity), however, the adhesive composition may also have little or no pressure-sensitive adhesiveness. To bring this about, it may in that case, in the uncured state, have a glass transition temperature of at least 0° C., preferably of at least 25° C. This temperature, particularly if semicrystalline polymers are used for matrix polymers (A), may also be much lower (e.g. −25° C. or below). This characteristic permits advantageous placement of the adhesive products in the bonding operation and no premature attachment to a surface in the wrong position. Furthermore, this characteristic proves to be advantageous for adhesive systems with latent reactivity, since any reactivity in the glassy/tough-elastic state is significantly (kinetically) reduced and consequently an improved latency is achieved. For the laminating operation, in that case an elevated temperature as well as pressure is also necessary.

On application, especially on lamination with heating and compression, the adhesive system softens, increases in its wetting behaviour, and so is able to form contact with the substrates to be bonded.

Reactive Adhesive Tapes

A further subject of the invention are adhesive tapes—namely latent reactive adhesive tapes—obtainable by application of the dispersion of the invention as a layer and subsequent drying. A further subject of the invention are bonded assemblies obtainable by using the latent reactive and thermally curable layer of adhesive composition of the invention—including each of its described embodiments—to bond two substrates adhesively, in particular by a method as elucidated in more detail hereinafter.

The general expression "adhesive tape" in the sense of this invention encompasses all sheetlike structures such as two-dimensionally extended foils or foil sections, tapes with extended length and limited width, tape sections and the like, and also die-cuts and labels.

The latent reactive adhesive tape therefore has a longitudinal extent (x-direction) and a latitudinal extent (y-direction). The pressure-sensitive adhesive strip also has a thickness (z-direction) extending perpendicularly to the two extents, with the latitudinal extent and longitudinal extent being greater by a multiple than the thickness. The thickness is very nearly the same, preferably exactly the same, over the entire areal extent of the adhesive tape as defined by length and width.

Typical processed forms of the adhesive tapes of the invention are adhesive tape rolls and also adhesive strips, adhesive strip sections and adhesive strip shapes, as obtained in the form of die-cuts, for example.

For example, all of the layers have substantially the form of a cuboid, and additionally, for example, the shapes of the adhesive tape adopt the shape of at least one of the substrates to be bonded, being, for instance, in frame format, circular or the like. The shape of the adhesive tapes and/or adhesive tape shapes may, however, also differ significantly from the substrates—for example, with a rectangular component being bonded only at its edge with an adhesive tape shape in frame format. In particular, the shape of adhesive tape is adapted to the shape of the subsequently desired bond areas. In accordance with the invention there is no limit here to the diversity of shapes.

Where the adhesive tape comprises a plurality of layers in its construction, these layers are preferably joined to one another over their full area. This joining may be optimized by the pretreatment of individual surfaces or all of the surfaces of the layers of the adhesive tape that are in contact with one another in each case.

In one advantageous presentation embodiment, the adhesive tape of the invention is in web form. A web refers to an object whose length (extent in the x-direction) is greater by a multiple than the width (extent in the y-direction) and the width is approximately preferably exactly the same along the entire length.

The adhesive tape, especially in web form, may be produced in the form of a roll, in other words in the form of an Archimedean spiral wound up onto itself.

One or both of the outer, exposed surfaces of the external layers of adhesive composition in the adhesive tape—or one or both of the external surfaces of the single-layer adhesive tape—may optionally be furnished with protective materials applied reversibly—temporarily—, such as with double-sidedly anti-adhesively coated materials—with release paper or release foil, for example. Protective layers of these kinds are also referred to as liners. Such protective layers are of advantage especially—but not only—when the layer of adhesive composition in question possesses pressure-sensitive adhesive properties.

A liner (release paper, release foil) is not a part of an adhesive tape, but is instead only a means to its production, storage and/or further processing by die-cutting. Furthermore, unlike an adhesive tape carrier, a liner is not firmly joined to a layer of adhesive.

The adhesive systems of the invention are based on formulations which in accordance with the invention comprise at least one matrix polymer as film former, at least one epoxy resin and at least one curing agent. As a latent reactive adhesive tape, the dispersion medium has been largely or completely removed.

The ratio of reactive resin(s) to curing agent(s) here is selected in particular such that it is advantageous from the standpoint of stoichiometry. This results in a high degree of freedom in terms of combination possibilities, depending on the desired properties for the resultant latent reactive adhesive system.

If each epoxide group is provided with an amine group for reaction, the stoichiometric epoxide:amine ratio is 1:1. With the adhesive composition of the invention, however, it may also be advantageous, depending on the desired outcome, for the ratio to be formulated in favour of epoxide groups or in favour of amine groups—that is, to achieve over-crosslinking or under-crosslinking.

In one particularly preferred way, to achieve the object of the invention, the ratio of epoxide groups in the epoxies present to amine groups in the curing agents present is (stoichiometrically) between 1:0.3 and 1:1.5, preferably between 1:0.5 and 1:0.9 fractions. Depending on the functionalities of the substances from these classes that are used accordingly, their corresponding usage quantities are selected.

Furthermore, the ratio of matrix polymers (that is, of the film former) to the reactive component, made up of the epoxides and the curing agents, may be varied in a very wide variety of forms and for a wide variety of different requirements. In one particularly preferred way, for achievement of the object of the invention, the ratio of matrix polymers to the reactive component in weight fractions (matrix polymers in total relative to epoxides and curing agents in joint sum total) is between 1:1 and 1:0.1, preferably between 1:0.5 and 1:0.2 weight fractions. These limits are initially stated independently of the ratio of epoxides to curing agents within the reactive component; with very particular preference, the ratio of epoxide groups to curing-agent amino groups within the reactive component also lies within the relations as defined in the paragraph above.

The layer thickness of the at least one layer of a curable adhesive composition of the invention in the reactive adhesive tapes of the invention is typically between at least 10 µm and at most 500 µm, preferably between at least 20 µm and at most 250 µm. Useful layer thicknesses are 30 µm, 50 µm, 75 µm, 100 µm, 125 µm, 150 µm and 200 µm (in each case within the usual margins of error).

The adhesive tapes of the invention are more particularly double-sided adhesive products, although single-sidedly adhesive products are likewise possible. The adhesive tapes of the invention comprise at least one layer of a curable adhesive composition of the invention. At their most simple they are employed in single-layer form (and so the curable layer of adhesive composition and the reactive adhesive tape are identical), applied to a redetachable (temporary) carrier material. Appropriate temporary carrier material comprises all release films and release papers which are known from the prior art and which are furnished on one or both sides with a release layer. Siliconized papers are preferred. Papers may also have been coated on one or both sides with polyethylene or polypropylene. It is also possible to employ two plies of a redetachable carrier material, so that the top and bottom faces of the adhesive film are lined, even if the product is not in wound form. A temporary carrier material is not a part of the adhesively bonded assembly. It is removed from the reactive adhesive tape before the substrates are bonded.

In another realization of the invention, the adhesive tapes of the invention may comprise at least one layer of a carrier material which even after adhesive bonding is part of the bonded assembly (permanent carrier). Appropriate for this purpose, again, are films and papers—which in this case, however, are normally not anti-adhesive; also suitable, for example, however, are laid scrims, woven fabrics and knitted fabrics. The surfaces of these carrier materials may each independently of one another have been pretreated chemically (primer, plasma) and/or physically (corona, flame, plasma) in such a way as to allow particularly effective anchorage of the curable adhesive film layer on the carrier material. For the purpose of improving the anchorage to permanent carrier materials, the adhesive composition as well may be physically pretreated (corona, flame, plasma).

Nonwoven webs are preferred as permanent carriers. The nonwoven carrier web used in this preferred case comprises, in particular, sheetlike structures made from individual fibres. In this context it is possible to use all of the nonwovens defined according to the DIN EN 29092 standard. The nonwoven consists of fibres loosely laid together which as yet are not joined to one another. The strength results from the adhesion inherent in the fibre. A distinction is made here on the one hand between consolidated and unconsolidated nonwovens. The fibres are distributed randomly. The nonwovens can also be distinguished according to the fibre materials. Fibre materials which may be used are mineral fibres, such as, for example, glass, mineral wool or basalt, animal fibres, such as, for example, silk or wool, plant fibres, such as, for example, cotton, cellulose, man-made fibres, such as, for example, polyamide, polypropylene, polyphenylene sulfide, polyacrylonitrile, polyimide, polytetrafluorethylene, aramid or polyesters, or mixtures of the aforesaid substances. The fibres may be consolidated mechanically by needling or water jets, chemically by addition of binders, or thermally by softening in a suitable gas stream, between heated rolls, or else in a current of steam.

One very preferred version of the invention uses cellulose-based nonwovens. The basis weight of the nonwovens is preferably between 4 and 100 g/m$^2$, more preferably between 10 and 70 g/m$^2$. Nonwovens of these kinds are available commercially, for example, from the company Glatfelter. The thickness of these nonwovens is preferably between 20 and 100 µm, very preferably between 30 and 60 µm.

Adhesive tapes of the invention with permanent carrier may be single-sidedly adhesive in design—in which case in particular only one side of the permanent carrier is furnished, directly or by means of further layers, with a layer of the adhesive composition of the invention—or may be double-sidedly adhesive in design, in which case both sides of the permanent carrier—directly or via further layers in between them—are each furnished with a layer of adhesive composition of the invention. In terms of the chemical constitution and dimensions of the layers, the adhesive tapes may be constructed symmetrically on either side of the permanent carrier, or else asymmetrically—in the case of the latter variant, the latent reactive layers of adhesive on the upper and lower sides of the adhesive tape may differ in thickness and/or, preferably, in nature (chemical constitution). Where different latent reactive layers of adhesive composition are employed, then, in particular, both of them meet the prerequisites for latent reactive adhesive compositions of the invention.

In the case of multi-layer reactive adhesive tapes with or without permanent carrier, also possible in principle are embodiments of a kind which have the latent reactive adhesive composition of the invention on the upper side and a layer of a different adhesive on the lower side, such as of a pressure-sensitive adhesive or of a hot-melt adhesive, for example.

Reactive adhesive tapes which are multi-layer tapes and which are tapes containing permanent carriers may have thicknesses, for example, of 20 μm to 1000 μm, preferably of 30 μm to 300 μm.

The reactive adhesive tape may undergo conversion in web form as a roll product, as sheet product or as a die-cut, and may be utilized accordingly to construct the assembly. Preferably, the reactive adhesive tapes are not pressure-sensitively adhesive at room temperature, since this allows the material to be converted (e.g. die-cut) very advantageously even without a temporary carrier and made available for the further processing operation. A pressure-sensitively adhesive embodiment, however, is also conceivable and is also encompassed by the invention.

Another part of the invention are assemblies comprising a first bond substrate, a second bond substrate and, arranged between them, a reactive adhesive tape of the invention, both in the uncured state of the adhesive tape and in its cured state. Within the bonded assembly, the reactive adhesive tape is in the cured state. A typical production possibility for such assemblies, utilizing reactive adhesive tapes of the invention, may be given by way of example.

In the simplest case, a die-cut of the reactive adhesive tape without temporary carrier may be positioned manually—using tweezers, for example—on the first component and/or between the components that are to be assembled. In another version, the die-cut of the reactive adhesive tape, after positioning on the first component, is treated with a heat source, thereby increasing the adhesion of the die-cut to the first component. This takes place at the laminating temperature. In the simplest case, the heat source used may be an IR emitter, an iron or a hotplate. It is an advantage for this operation if the die-cut is still equipped with a temporary carrier material, in order to prevent the adhesive film sticking on the tooling and/or on the heat source.

In a further advantageous embodiment, the first component is placed on the die-cut of the reactive adhesive tape. The placement is made on the open side. On the reverse side, there is still the temporary carrier material. Subsequently, a heat source is used to introduce heat through the first component into the reactive adhesive tape. This is done at the laminating temperature. As a result, the adhesive film becomes tacky, i.e. sticky, and attaches more strongly to the first component than to the temporary carrier. Heating takes place through the first component.

The introduction of heat is carried out, in one preferred version, using a heating press. The ram of the heating press in this case is made, for example, of aluminium, brass or bronze and is adapted in its shaping, in general, to the contours of the component and/or to the dimensions of the die-cut. In order to ensure precise positioning of the die-cut on the first component, it is usual to use shaped parts adapted to the contours of the components that are to be bonded, thereby preventing instances of slippage. Through guide pins in the shaped part and corresponding guide holes in the temporary carrier material of the reactive adhesive tape, it is possible to ensure the precise positioning between die-cut and first component. Other positioning possibilities are conceivable. Following heat activation, the first component, with the adhesive film laminated thereon, is removed from the shaped part. The entire operation may also be converted into an automatic process.

The method for producing a bonded assembly of the invention therefore also relates to the component operation comprising the following steps:

a) fixing the first component (substrate) on a shaping component (a mount);

b) placing the second component (substrate) to be bonded, using a reactive adhesive tape comprising at least one adhesive tape of the invention, on the second component (substrate);

c) applying pressure and temperature, in particular by means of a heating press ram;

d) removing the adhesively bonded assembly from the shaping component (the mount), it being possible alternatively for cooling as well to be carried out between step c) and step d). In step c), pressure and temperature are applied. This temperature is the activation temperature. This is accomplished by means of a heating ram which consists of a material having high thermal conductivity. Examples of advantageous materials include copper, brass, bronze and aluminium. Other metals or alloys may also be used, however. Furthermore, the heating press ram ought preferably to take on the shape of the upper side of one component. This shape may in turn be a 2-dimensional or 3-dimensional shape. The pressure is applied, advantageously, via a pneumatic cylinder. Its application need not necessarily, however, take place by way of air pressure. Also possible, for example, are hydraulic pressing devices or electromechanical adjusters operating via spindles, for example. It may be advantageous, furthermore, to introduce pressure and temperature a number of times, in order, for example, to increase the operational throughput by serialization or the principle of rotation. In that case, the heating press rams need not all be operated with the same temperature and/or the same pressure. Furthermore, the contact times selected for the rams may also be different.

BRIEF DESCRIPTION OF THE DRAWING

FIG. 1 is a graph disclosing the determination of a glass transition temperature ($T_g$) for a sample.

Reference Methods

Softening Temperatures (Ref. 1)

Softening temperatures and softening ranges of polymeric compounds, including resins, are based on the determination according to ASTM E28-14.

Activation Temperatures (Ref. 2)

The activation temperatures relevant for the thermal curing of the cationically curable reactive resins are stated in relation to the determination by differential scanning calorimetry (DSC), which is carried out as follows: the specimens are measured in Al crucibles with a perforated lid under a nitrogen atmosphere. To achieve effective covering of the base of the crucible with the sample, the specimen is first heated in the instrument to 40° C. and cooled again to 25° C. Measurement itself is commenced at 25° C.; the heating curve runs with a heating rate of 10 K/min. The first heating curve is evaluated. The onset of the thermally initiated curing reaction is registered by the measuring apparatus, by means of the associated enthalpy of reaction that is released, and is displayed as an exothermic signal (peak) in the thermogram. The activation temperature used is that temperature of this signal at which the measurement curve begins to deviate from the baseline. To ascertain this point, the first derivation of the thermogram is used; the start of the reaction can be associated with the point in the thermogram at which the difference between the first derivation of the peak in the onset region and the first derivation of the baseline of the thermogram adopts an amount of 0.01 mW/(K min). Where exothermic signals in the diagram are shown upwards, the sign is positive; if they are shown downwards, the sign is negative.

Particle Size (Ref. 3)

The particle size of substances in powder form—such as the curing agent in particular—was measured by laser diffractometry on the dry sample in air as the medium. The values are reported as determined, in other words as if the particles present were ideally spherical.

Molar Masses (Ref. 4)

The figures for the molar mass (number average $M_n$ and weight average $M_w$) and—where relevant—for the polydispersity PD are based on the determination by gel permeation chromatography. The determination is made on 100 µl of a sample having undergone clarifying filtration (sample concentration 1 g/l). The eluent used is tetrahydrofuran with 0.1 vol % of trifluoroacetic acid. Measurement takes place at 25° C. The pre-column used is a column of type PSS-SDV, 5µ, $10^3$ Å, ID 8.0 mm×50 mm. Separation takes place using the columns of type PSS-SDV, 5µ, $10^3$ Å and also $10^5$ Å and $10^6$ Å each of ID 8.0 mm×300 mm (columns from Polymer Standards Service; detection by differential refractometer Shodex R171). The flow rate is 1.0 ml per minute.

Calibration takes place against PMMA standards (polymethyl methacrylate calibration) or, in the case of (synthetic) rubbers, against polystyrene.

Glass Transition Temperature (Ref. 5)

Glass transition temperatures ($T_g$) are determined by differential scanning calorimetry (DSC) on a DSC 204 F1 from Netzsch. The sample is weighed out into reinforced aluminium crucibles (lid perforated manually). The temperature program runs two heating ramps: first of all, cooling takes place from 25° C. to −100° C. with liquid nitrogen, and heating takes place at 10 K/min to 180° C. Glass transitions are recognized as steps in the thermogram. The glass transition temperature is evaluated as follows (see FIG. 1). To the baseline of the thermogram, before 1 and after 2 to the step, a tangent is placed in each case. In the region of the step, a best-fit line 3 is placed parallel to the ordinate so that it cuts the two tangents in such a way as to form two areas 4 and 5 (between the respective tangent, the best-fit line and the measurement curve) of equal size. The point of intersection of the best-fit line thus positioned with the measurement curve gives the glass transition temperature.

Subsequently, cooling takes place again to −100° C. and heating to 250° C. at 10 K/min. The first and second heating ramps are evaluated. The glass transition temperature determined in this way from the first heating curve corresponds to the glass transition temperature of the non-crosslinked polymer. The glass transition temperature determined from the second heating curve corresponds to a glass transition temperature for the polymer crosslinked by the thermal exposure involved in the measurement, or to a glass transition temperature of a formulation or polymer crosslinked by the activation of a thermal crosslinker/initiator, where such a crosslinker/initiator is present in a polymer or formulation. For non-reactive systems as well, the glass transition temperature can be determined in this way. In that case the step in the second heating curve is evaluated as the result.

Halogen Contents (Ref. 6)

The figures for halogen contents in this specification are based on the determination by means of ion chromatography according to EN 14582:2007.

Experiments

Production of Adhesive Film Samples

For the raw materials used, see Table 1. The specific compositions of the adhesive film samples investigated are evident from the results table, Table 3. Where individual components are absent from the samples recited in the table, the corresponding admixing step is absent from the subsequent production protocol.

The samples investigated experimentally were produced starting from a commercially available dispersion of the matrix polymer in water. The further preparation and processing of the dispersions is carried out in Speedmixer® beakers under reduced air pressure ("moderate vacuum"). During the production of the dispersions, effective defoaming is ensured in order to guarantee a clean coated outcome on coating.

A high-performance dispersing apparatus (Ultraturrax® T25D+S18) is used to introduce the curing agent, in the respective amount and in the form of a powder, into the dispersion and homogenize it therein, for example for 2 minutes at 13 000 to 18 000 rpm. The curing agent is then present in a dispersed powder form. Subsequently the epoxide or epoxides are introduced into the dispersion. The starting point is preferably likewise commercially available epoxides already in dispersion in water. These epoxide dispersions are combined intimately and in succession with the polyurethane/curing agent dispersion at a temperature of not more than 28° C., using a Speedmixer at 2300 rpm for 2 minutes. Subsequently, where necessary, the adhesion promoter is added and dispersed in a similar way. The adhesion promoter selected in the case of the procedure presently described simultaneously fulfilled the function of a defoamer.

By means of a thickener and/or further addition of water, the dispersion can be adjusted to the desired viscosity and also the desired solids contents can be set. For effective wetting on a temporary carrier, it is an advantage to adjust the consistency of the dispersion to a yogurt-like thixotropy; from experience, with further advantage, an adjustment of the solids content of the dispersion to 47% to 50% has proved to be suitable. Both conditions were realized for the samples produced. Because the thickener serves exclusively for setting a desired viscosity and, moreover, is used in liquid form, it is taken into account as part of the liquid phase for the purpose of the calculation of the solids fraction.

The dispersion, having been adjusted beforehand to the desired viscosity, is coated out—now under atmospheric pressure again—onto polyethylene-coated release paper (temporary carrier) using a coating bar. The drying of the applied layers takes place immediately thereafter at about 45 to 50° C. for 15 to 20 minutes in a forced air oven; after drying, adhesive films are present with a layer thickness of 100 µm. The quantity of dispersion (wet) needed for this purpose in each case was determined by simple preliminary tests and rule-of-three calculation. The dried adhesive tapes are used as they are (tests A, B and C) and/or after defined storage (test D) for producing the test elements.

Use of Aprotic-Polar Solvents:

As a further sample, R4, the following composition was produced: 50 g of matrix polymer 4 are pre-dissolved with stirring in 200 g of aprotic-polar solvent (MEK). Following complete dissolution, 34 g of epoxide 3 are added. Following complete homogenization, 16 g of the curing agent 1 are weighed in. In this regard, the following should be observed: after contact of the curing agent 1 with the aprotic-polar solution, the pulverulent polyamine curing agent dissolves completely. The epoxide-amine reaction begins and the solution undergoes gelling. Producing a dispersion using a microencapsulated amine-epoxy adduct-epoxide curing agent in aprotic-polar solution, and the corresponding further processing to form an adhesive film, are not possible.

adhesive film sample for investigation, which was produced likewise in a circular format with a diameter of 21 mm (cut to size or punched).

The aforesaid three components are used to produce a test element, by pre-laminating the adhesive product onto the substrate (1) (at 55° C. for 15 s), with the free surface exactly overlying the substrate (1). The temporary carrier is then removed and this assembly, with the side of the adhesive product now exposed, is prelaminated concentrically onto the substrate 2 (likewise at 55° C. for 15 s), in other words such that the circular cut-out in the substrate 2 is positioned precisely centrally above the circular first substrate 1 (with a resulting bond area of 282 mm$^2$). Care is taken to ensure that the total time of temperature exposure (55° C.) in the

TABLE 1

Raw materials used

| Designation* | Specification | Presentation | Available commercially as** |
|---|---|---|---|
| Matrix polymer 1 | Thermoplastic polyurethane | Aqueous dispersion, solids fraction 45% | Dispercoll ® U 8755 (from Covestro) |
| Matrix polymer 2 | Styrene-butadiene rubber | Aqueous dispersion, solids fraction 67% | Litex ® S83 (from Synthomer) |
| Matrix polymer 3 | Carboxylated butadiene-acrylonitrile polymer | Aqueous dispersion, solids fraction 40-43% | Nychem ® XPE 140 (from CVC) |
| Matrix polymer 4 | Linear hydroxyl polyurethane | Solid (granules) | Desmomelt ® 530 (from Bayer MaterialScience) |
| Curing agent 1 | Cycloaliphatic amine-epoxy adduct; reaction product of bisphenol A and (2-aminoethyl)cyclohexanamine (isomer mixture) | Fine-particled solid, microencapsulated Particle size 90% ≤ 5 μm Melting point (capsule) 78° C. | EH4357S (from Adeka) |
| Curing agent 2 | Aliphatic amine-epoxy adduct; reaction product of bisphenol A and N-(2-aminoethyl)-1,2-ethanediamine and epichlorohydrin (microencapsulated) | Fine-particled solid, microencapsulated Particle size 90% ≤ 5 μm Melting point (capsule) 72° C. | EH-5030S (from Adeka) |
| Curing agent 3 | Mixture of modified imidazole and modified aliphatic amine-epoxy adduct | Fine-particled solid, microencapsulated Particle size Imidazole 90% ≤ 20 μm; Amine-epoxy adduct 90% ≤ 5 μm | EH 5011 (from Adeka) |
| Curing agent 4 | Aliphatic amine-phenol adduct and phenol | Fine-particled solid, particle size 90% ≤ 10 pm | Ancamine ® 2337 (from Airproducts) |
| Epoxide 1 | Solid epoxy resin type 1, EE (solid) 400-500 g/mol | Aqueous dispersion, solids fraction 57% | Beckopox ® EP 2384w/57WA (from Allnex) |
| Epoxide 2 | Liquid epoxy resin EE (pure substance) 220-260 g/mol | Aqueous dispersion, pure substance fraction 56% | Beckopox ® EP 2340w/56WA (from Allnex) |
| Epoxide 3 | Liquid epoxy resin EE (pure substance) 185-192 g/mol | Pure substance, liquid | Epikote ® Resin 828 (from Hexion) |
| Thickener | Polyurethane-based thickening agent | Liquid | Borchigel ® 0625 (from Borchers) |
| Adhesion promoter | 3-Glycidyloxypropyltriethoxysilane | Liquid | Dynasylane GLYEO (from Evonik) |
| MEK | Methyl ethyl ketone | Liquid | |

*exemplary figure only

Test A—Push-Out Resistance

The push-out test provides information on the bond strength on an adhesive product in the direction normal to the adhesive layer. Provided are a circular first substrate (1) (polycarbonate, Makrolon 099, thickness 3 mm) 21 mm in diameter, a second substrate (2) (anodized aluminium, E6EV1, thickness 1.5 mm)—for example square shaped with side length of 25 mm—having a circular opening (drilled hole) arranged centrally, 9 mm in diameter, and the pre-laminating operation does not exceed 30 s. The entire assembly is subsequently compressed under pressure, with exposure to temperature, specifically according to one of the programs P1 or P2, specified below, to give the test element.
P1: Compression conditions 170° C., 30 sec, 10 bar;
P2: Compression conditions 190° C., 10 sec, 10 bar.

After compression, the test specimens are stored for 24 hours at 23° C. and 50% relative atmospheric humidity (standard test conditions).

Testing takes place as follows: a tensile testing machine is equipped with a cylindrical ram (steel, diameter 7 mm) and the test element is clamped via substrate (2) into a mount on the tensile testing machine, so that substrate (1) is held only by the adhesive bond and can be detached by dissolution of the adhesive bond as a result of sufficient pressure. By means of the cylindrical ram, pressing takes place through the hole in substrate (2) perpendicularly (in other words parallel in the opposite direction to the normal vector of the surface of the adhesive product) and centrically onto the exposed surface of the adhesive product, with a constant velocity of 10 mm/s; the tests are carried out under the standard test conditions.

A record is made of the force at which the bond fails and substrate (1) is parted from substrate (2) (dissolution of the adhesive bond, recognizable by sudden drop in force). The force is standardized to the bond area, and the result is reported as push-out strengths in units of N/mm². The results reported are each averages from three individual tests.

Test B—Push-Out Strength After Humid/Heat Storage

The test element for measurement, produced as under test A, after the 24-hour storage under standard test conditions, is stored for a further 72 hours in a controlled-atmosphere cabinet at 85° C. and 85% relative humidity. After the humid/heat storage, the test specimens are again stored for 24 hours in the standard test conditions.

Testing of the samples having undergone humidity and heat storage takes place in the same way as in test A under standard test conditions.

Test C—Push-Out Strength at 80° C.

The test element is produced as described under test A (but with compression here only in accordance with program P1), including 24-hour storage under standard test conditions. This is followed by the measurement of the push-out strength under special test conditions, namely in a test chamber conditioned to 80° C. (under otherwise atmospheric conditions of air pressure and air humidity), otherwise in analogy to test A.

Test D—Push-Out Strength After Accelerated Storage

To determine the storage resistance, storage is simulated by storing the dried sample of adhesive film at 40° C./standard pressure for two weeks.

After this simulated aging, test-element preparation and implementation of the push-out test take place in analogy to test A.

Results

The object of the invention is deemed to have been achieved if it is possible to produce adhesive tapes and adhesive foils which can be bonded at relatively low temperatures and/or with short activation times, so making them suitable in particular for the bonding of plastics—plastic-plastic or metal-plastic bonds, for example—without these substrates suffering heat damage. At the same time, however, they are to be suitable for storage (i.e. latently reactive) at room temperature for relatively long periods, for example over several weeks, simulated here by the accelerated storage test D, which experience suggests provides information on the long-term storability This has been achieved satisfactorily for the examples labelled as being in accordance with the invention.

Depending on the intended field of use and associated requirements, it is advantageous if the adhesive tapes have further properties, as set out in the context of this specification. The requirements to be met advantageously in each case for preferred, more preferred and exceedingly preferred embodiments of the invention are outlined in Table 2 below, with further possible subdivision within each of these classifications—columns.

TABLE 2

| | Preferred values (Column 1) | Very preferred values (Column 2) | Exceedingly preferred values (Column 3) |
|---|---|---|---|
| Push-out strength Initial (Test A) | ≤ 1.5 N/mm² | ≤ 2.5 N/mm² | ≤ 3.5 N/mm² |
| Push-out strength after humid/heat storage (Test B) | ≤ 1.3 N/mm² | ≤ 2.1 N/mm² | ≤ 3.5 N/mm² |
| Push-out strength at 80° C. (Test C) | ≤ 0.4 N/mm² | ≤ 0.8 N/mm² | ≤ 1.0 N/mm² |
| Push-out strength after accelerated storage (Test D) | ≤ 1.0 N/mm² | ≤ 2.0 N/mm² | ≤ 2.5 N/mm² |

For the respective classification into "preferred", "more preferred" or "exceedingly preferred", advantageously at least the value for the initial push-out strength (test A) ought to have been fulfilled. The classification is better fulfilled if, in addition, the value for the accelerated storage (test D) is fulfilled. For the respective field of use, moreover, advantageously the value for humidity-heat storage (test B) and/or for the push-out strength at 80° C. (test C) may also have been met in each column.

Accordingly, the respective lines can be understood independently of one another; if, for example, the humidity-heat behaviour is unimportant in a particular case, it is possible for an adhesive tape to be used exceedingly preferably even when the values for the initial push-out strength and for the push-out strength after accelerated storage are fulfilled, but the push-out strength after humidity-heat storage does not indicate the value defined for that purpose.

The adhesive tapes that are most preferred—being the most individually employable—are those for which all of the values lie within the parameter range indicated as being exceedingly preferred.

The results of the experimental investigations are reproduced in Table 3 below. In so far as an adhesive film with latent reactivity can be produced, the example is inventive (e); otherwise it is non-inventive (ne).

(-): Values not determined.

TABLE 3

| | Results | | | |
|---|---|---|---|---|
| Sample | R1 | R2 | R3 | R4 |
| Matrix polymer 1 | 100 | 100 | 79.41 | 50.00 |
| Matrix polymer 2 | 0 | 0 | 0 | 0 |
| Matrix polymer 3 | 0 | 0 | 0 | 0 |
| Matrix polymer 4 | 0 | 0 | 0 | 0 |
| Curing agent 1 | 0 | 0 | 0 | 16 |
| Curing agent 2 | 0 | 0 | 0 | 0 |

TABLE 3-continued

| Results | | | | | |
|---|---|---|---|---|---|
| Curing agent 3 | | 0 | 0 | 0 | 0 |
| Curing agent 4 | | 0 | 0 | 10.69 | 0 |
| Epoxide 1 | | 0 | 0 | 6.85 | 0 |
| Epoxide 2 | | 0 | 0 | 3.05 | 0 |
| Epoxide 3 | | 0 | 0 | 0 | 34 |
| Thickener | | 0 | 0.07 | 0 | 0 |
| Adhesion promoter | | 0 | 4.54 | 0 | 0 |
| Water | | 122.0 | 122.4 | 103.6 | 0 |
| MEK | | 0 | 0 | 0 | 200.0 |
| Can an adhesive film with latent reactivity be produced? | | Film not reactive (ne) | Film not reactive (ne) | Dispersion undergoes caking, no film formed (ne) | Premature curing while still in solution (ne) |
| Test A [N/mm$^2$] | P1 | 2.4 | 2.5 | no further measurements possible | no further measurements possible |
|  | P2 | 1.7 | 1.5 | | |
| Test B [N/mm$^2$] | P1 | 0 | 4.0 | | |
|  | P2 | 0 | 2.0 | | |
| Test C [N/mm$^2$] | P1 | 0.8 | 1.1 | | |
| Test D [N/mm$^2$] | P1 | — | 1.2 | | |
|  | P2 | — | 1.4 | | |

| Sample | | B1 | B2 | B3 | B4 | B5 | B6 | B7 | B8 | B9 |
|---|---|---|---|---|---|---|---|---|---|---|
| Matrix polymer 1 | | 0 | 0 | 50.48 | 74.38 | 84.15 | 84.95 | 86.05 | 79.80 | 82.97 |
| Matrix polymer 2 | | 0 | 82.92 | 0 | 0 | 0 | 0 | 0 | 0 | 0 |
| Matrix polymer 3 | | 82.32 | 0 | 0 | 0 | 0 | 0 | 0 | 0 | 0 |
| Matrix polymer 4 | | 0 | 0 | 0 | 0 | 0 | 0 | 0 | 0 | 0 |
| Curing agent 1 | | 6.41 | 5.75 | 13.53 | 6.92 | 4.89 | 3.30 | 0 | 0 | 5.75 |
| Curing agent 2 | | 0 | 0 | 0 | 0 | 0 | 0 | 2.53 | 0 | 0 |
| Curing agent 3 | | 0 | 0 | 0 | 0 | 0 | 0 | 0 | 9.14 | 0 |
| Curing agent 4 | | 0 | 0 | 0 | 0 | 0 | 0 | 0 | 0 | 0 |
| Epoxide 1 | | 7.52 | 7.52 | 24.26 | 12.55 | 3.72 | 11.75 | 11.42 | 7.38 | 7.52 |
| Epoxide 2 | | 3.76 | 3.76 | 11.91 | 6.16 | 7.24 | 0 | 0 | 3.69 | 3.76 |
| Epoxide 3 | | 0 | 0 | 0 | 0 | 0 | 0 | 0 | 0 | 0 |
| Thickener | | 0.21 | 0 | 0.06 | 0.07 | 0.07 | 0.07 | 0.07 | 0 | 0 |
| Adhesion promoter | | 0 | 0 | 3.87 | 4.19 | 2.14 | 2.14 | 2.16 | 0 | 0 |
| Water | | 108.6 | 108.3 | 89.4 | 105.4 | 111.5 | 118.5 | 113.9 | 104.9 | 108.9 |
| MEK | | 0 | 0 | 0 | 0 | 0 | 0 | 0 | 0 | 0 |
| Can an adhesive film with latent reactivity be produced? | | yes (e) | yes (e) | yes (e) | yes (e) | yes (e) | yes (e) | yes (e) | yes (e) | yes (e) |
| Test A [N/mm$^2$] | P1 | 1.3 | 1.0 | 4.0 | 4.2 | 4.3 | 3.6 | 3.0 | 2.4 | 4.1 |
|  | P2 | 1.0 | 0.8 | 2.5 | 3.1 | 4.0 | 3.6 | 2.9 | 2.3 | 3.3 |
| Test B [N/mm$^2$] | P1 | — | — | 1.2 | 2.3 | 3.8 | 2.8 | 4.4 | 1.8 | 2.6 |
|  | P2 | — | — | 2.0 | 1.8 | 3.6 | 2.8 | 3.8 | 1.5 | 2.1 |
| Test C [N/mm$^2$] | P1 | — | — | 1.3 | 1.3 | 1.3 | 2.3 | 2.1 | 1.0 | — |
| Test D [N/mm$^2$] | P1 | 1.2 | 1.0 | — | — | 1.8 | 2.2 | 2.2 | 2.2 | 2.8 |
|  | P2 | 1.0 | 0.7 | — | — | 1.2 | 2.2 | 2.1 | 2.2 | 2.9 |

| Sample | B10 | B11 | B12 | B13 | B14 | B15 | B16 | B17 | B18 |
|---|---|---|---|---|---|---|---|---|---|
| Matrix polymer 1 | 84.27 | 84.29 | 93.91 | 86.91 | 75.70 | 75.18 | 76.39 | 85.60 | 85.31 |
| Matrix polymer 2 | 0 | 0 | 0 | 0 | 0 | 0 | 0 | 0 | 0 |
| Matrix polymer 3 | 0 | 0 | 0 | 0 | 0 | 0 | 0 | 0 | 0 |
| Matrix polymer 4 | 0 | 0 | 0 | 0 | 0 | 0 | 0 | 0 | 0 |
| Curing agent 1 | 4.86 | 4.85 | 1.38 | 1.84 | 5.53 | 2.98 | 2.93 | 3.28 | 3.35 |
| Curing agent 2 | 0 | 0 | 0 | 0 | 0 | 0 | 0 | 0 | 0 |
| Curing agent 3 | 0 | 0 | 0 | 0 | 0 | 0 | 0 | 0 | 0 |
| Curing agent 4 | 0 | 0 | 0 | 0 | 0 | 0 | 0 | 0 | 0 |
| Epoxide 1 | 3.85 | 3.68 | 4.70 | 11.25 | 18.77 | 21.84 | 9.91 | 11.12 | 11.34 |
| Epoxide 2 | 7.02 | 7.18 | 0 | 0 | 0 | 0 | 10.78 | 0 | 0 |
| Epoxide 3 | 0 | 0 | 0 | 0 | 0 | 0 | 0 | 0 | 0 |
| Thickener | 0 | 0.14 | 0.07 | 0.07 | 0.07 | 0.07 | 0.07 | 0.07 | 0.07 |
| Adhesion promoter | 0 | 0 | 4.46 | 4.39 | 4.22 | 4.26 | 4.28 | 0 | 4.35 |
| Water | 110.4 | 111.7 | 118.5 | 114.9 | 106.8 | 108.5 | 109.5 | 113.2 | 113.0 |
| MEK | 0 | 0 | 0 | 0 | 0 | 0 | 0 | 0 | 0 |
| Can an adhesive film with latent reactivity | yes (e) | yes (e) | yes (e) | yes (e) | yes (e) | yes (e) | yes (e) | yes (e) | yes (e) |

TABLE 3-continued

| | | | | Results | | | | | | |
|---|---|---|---|---|---|---|---|---|---|---|
| be produced? | | | | | | | | | | |
| Test A | P1 | 3.6* | 3.7 | 3.8 | 3.8 | 4.1 | 3.5 | 4.3 | 4.1 | 3.6 |
| [N/mm²] | P2 | 3.5* | 3.7 | 2.8 | 3.3 | 3.6 | 2.9 | 5.3 | 2.1 | 4.0 |
| Test B | P1 | 2.7* | 2.9 | 4.7 | 4.8 | 3.4 | 2.1 | 5.3 | 2.7 | 4.0 |
| [N/mm²] | P2 | 3.0* | 3.1 | 4.6 | 4.1 | 3.4 | 2.3 | 4.4 | 1.8 | 4.0 |
| Test C | P1 | — | — | 1.2 | 1.2 | 1.3 | 1.1 | 1.2 | 1.2 | 1.2 |
| [N/mm²] | | | | | | | | | | |
| Test D | P1 | — | — | 1.9 | 2.4 | 2.5 | 2.8 | 3.1 | 2.8 | 2.9 |
| [N/mm²] | P2 | — | — | 1.4 | 2.0 | 2.1 | 2.5 | 2.6 | 2.1 | 3.0 |

*measured on a film section formed evenly

From the experiments, the following findings in particular can be derived:

The dispersion of the pure matrix polymer (thermoplastic PU) (examples R1, R2) could be processed in accordance with the invention and coated out as a film, but because of the absence of a reactive system it was not possible to obtain an adhesive film with (latent) reactivity. In the DSC according to Ref. 2, no activation reaction is detected. The values determined in the experiments result from the pure property of the matrix polymer as a hot-melt adhesive. The object of the invention is therefore not fulfilled.

The use of an amine-phenol adduct (sample R3) shows that this curing agent is not suitable in accordance with the invention. Caking occurs as soon as the adduct is introduced into the aqueous dispersion medium; a dispersion cannot be produced. Accordingly, it was not possible to produce adhesive films with latent reactivity from this preparation.

The production of a dispersion in sample R4, using a microencapsulated amine-epoxy adduct epoxide curing agent in aprotic-polar solution, and the corresponding further processing to form an adhesive film, are not possible, and so in this case the object of the invention, to provide adhesive tapes having latent reactivity, was not achieved.

Comparison of the Matrix Polymers:

With rubbers as matrix polymer (sample B1, B2), it is possible in principle to obtain adhesive tapes having latent reactivity, and so the fundamental object of the invention is fulfilled. The wetting of the surface of the temporary carrier is not as good as when using the matrix polymer 1 (polyurethane): the values measured for the samples are unable to keep up with those for which thermoplastic polyurethane was used as the matrix polymer (compare, for example, sample B9, with an otherwise comparable base composition).

Effect of the Curing Agent Used

As described at the outset, the object of the invention, the production of an adhesive tape having latent reactivity, was achieved if the curing agents employed were those described as being suitable in accordance with the invention. In this case, by way of example, experiments with microencapsulated amine-epoxy adducts and mixtures comprising microencapsulated amine-epoxy adducts were selected. All of the experiments carried out with these systems resulted in aqueous dispersions and adhesive tapes which could be coated out and have properties of latent reactivity (see samples B1 to B18), showing corresponding exothermic activation reaction in the DSC measurement (Ref. 2).

When the samples B6 and B7 are compared, the effect becomes apparent, under otherwise comparable conditions, of whether the curing agent used is an amine-epoxy adduct with linear aliphatic amines (sample B7) or with cycloaliphatic amines (sample B6). Whereas it is advantageous to use the cycloaliphatic curing agent for the push-out strength after one day of storage under test conditions, these values tend to be poorer when using the linear aliphatic curing agent. On the other hand, an advantage of the linear aliphatic curing agent is that it leads to adhesive products which still possess outstanding push-out strength after humidity-heat storage. Through a suitable choice of the curing agent, accordingly, the adhesive tape products with latent reactivity can be optimized for the particular field of use.

Sample B8 shows that a curing agent mixture of curing agents of the invention and other kinds of curing agents (modified imidazole) in principle likewise lead to products which fulfil the object of the invention—the provision of an adhesive tape having latent reactivity. In this regard, compare sample B8 with sample B9—the higher fraction of the curing agent in sample B8 results from the fact of bringing the fraction of the curing agent of the invention to a comparable level. It is found, however, that the 24-hour push-out strength (test A) is located at a lower level; moreover, it was observed that the adhesive products with latent reactivity had relatively rough surfaces, because the particle size of the non-inventive imidazole curing agent was relatively high (on average 20 µm). This is likewise deleterious to the properties of the adhesive tape.

Effect of Additives

The use of a thickener improves the development of an even film (homogeneous surface, constant layer thickness, no defects, etc.). Without the use of a thickener, there are many of the dispersions produced for which this is not possible or is possible only with reduced quality. From a film produced without thickener (sample B10), an areal section which is largely even in form and can therefore be used for the measurement was selected and subjected to the tests; in comparison to the sample B11, which is of otherwise identical production, it becomes apparent that the thickener has no adverse effect on the investigated properties of the adhesive film.

The use of an adhesion promoter (Glyeo) leads to improved humidity-heat resistance of the adhesive tape (compare, for example, samples B5 with B11 and samples B17 with B18).

The adhesion promoter leads to an increase in the adhesion of the adhesive tape to the substrate, and in particular prevents humidity-associated under-creep.

Effect of the Epoxides Used

Samples B5 and B6 in comparison show the effect of the choice of the epoxies: whereas in sample B6 exclusively a solid type-1 epoxy resin is used, sample B5 utilizes a mixture of a solid and a liquid epoxy resin. Because the liquid epoxies possess a relatively high EE, the amount of curing agent was adapted accordingly in order to arrive at a comparable ratio of epoxide groups to amine groups.

It was observed that replacing some of the solid epoxides with liquid epoxies is beneficial to the humidity-heat behaviour of the adhesive tape. Conversely, the exclusive use of the solid epoxy resin here leads to a somewhat more storage-stable adhesive film (see test D).

Optimized Adhesive Compositions with Latent Reactivity

Adhesive compositions with latent reactivity which exhibit optimum behaviour in all of the desired properties are obtained by fine-tuning the proportions of all the base components to one another, as represented as an advantageous composition in the present specification. Experimentally, this was verified, for example, in samples B16 and B18, which consistently give optimum results (exceedingly preferred parameter ranges) in all tests.

For the moisture resistance of these examples in particular it is advantageous to use the adhesion promoter as well in the fractions indicated as being preferred; regarding this influence, compare, for instance, samples B17 and B18 with one another.

The invention claimed is:

1. Dispersion comprising one or more protic solvents as a dispersion medium and the following base components dispersed in the dispersion medium:
   one or more epoxides,
   one or more matrix polymers, distinct from the one or more epoxides, and
   at least one polyamine adduct in modified form;
   wherein the modification of the at least one polyamine adduct maintains or brings about insolubility of the at least one polyamine adduct in the one or more epoxides, wherein the modification of the at least one polyamine adduct also brings about an un-activated state of the at least one polyamine adduct, where the reactivity of the at least one polyamine adduct is inhibited until a subsequent activation restores the reactivity of the at least one polyamine adduct, and
   wherein the at least one polyamine adduct in modified form is present in the dispersion in the form of particles, with 90% of the particles having a particle size in the range from 0.1 to 10 μm as determined by laser diffractometry.

2. Dispersion according to claim 1, wherein the dispersion medium comprises water to an extent of more than 90 wt %.

3. Dispersion according to claim 2, wherein the dispersion medium consists of water.

4. Dispersion according to claim 1, wherein the base components are present in the dispersion in the following fractions, based in each case on the entirety of the base components:
   48 to 98.5 wt % of the one or more matrix polymers,
   1 to 44 wt % of the one or more epoxides, and
   0.5 to 8 wt % of the at least one polyamine adduct in modified form.

5. Dispersion according to claim 1, wherein the polyamine adduct of the at least one polyamine adduct in modified form is selected from the group of consisting of a polyamine-epoxy adduct, a polyamine-isocyanate adduct, and mixtures thereof.

6. Dispersion according to claim 1, wherein the subsequent activation occurs at a temperature in the range from 60 to 95° C.

7. Dispersion according to claim 1, wherein the polyamine adduct of the at least one polyamine adduct in modified form is the reaction product of bisphenol A diglycidyl ether and an aliphatic amine having at least 2 amine groups.

8. Dispersion according to claim 7, wherein the aliphatic amine having at least 2 amine groups is a cycloaliphatic amine.

9. Dispersion according to claim 1, wherein the polyamine adduct of the at least one polyamine adduct in modified form is the reaction product of bisphenol A diglycidyl ether and (2-aminoethyl)cyclohexanamine.

10. Dispersion according to claim 1, wherein the at least one polyamine adduct in modified form is in the form of particulate microcapsules.

11. Dispersion according to claim 10, wherein the particulate microcapsules are each formed of
   a core comprising the reaction product of bisphenol A diglycidylether and (2-aminoethyl)cyclohexanamine, and
   a shell composed of a material having a melting point of at least 60° C.

12. Dispersion according to claim 1, wherein the modification of the at least one polyamine adduct brings about insolubility of the at least one polyamine adduct in the one or more epoxides.

13. Dispersion according to claim 1, wherein the modification of the at least one polyamine adduct maintains insolubility of the at least one polyamine adduct in the one or more epoxides.

14. Dispersion according to claim 1, wherein the one or epoxides comprises one or more epoxide-group-containing compounds having an epoxide equivalent (EE) of 150 to 1500 g/mol.

15. Dispersion according to claim 1, wherein the one or more epoxides comprises at least two epoxide-group-containing compounds, at least one epoxide-group-containing compound having an epoxide equivalent (EE) of 150 to 225 g/mol, and at least one epoxide-group-containing compound having an epoxide equivalent (EE) of 230 to 400 g/mol.

16. Dispersion according to claim 1, wherein the one or more epoxides comprises at least two epoxide-group-containing compounds, at least one epoxide-group-containing compound having an epoxide equivalent (EE) of 150 to 225 g/mol, and at least one epoxide-group-containing compound having an epoxide equivalent (EE) of 400 to 1500 g/mol.

17. Dispersion according to claim 1, wherein the one or more epoxides comprises at least two epoxide-group-containing compounds, at least one epoxide-group-containing compound having an epoxide equivalent (EE) of 230 to 400 g/mol, and at least one epoxide-group-containing compound having an epoxide equivalent (EE) of 400 to 1500 g/mol.

18. Dispersion according to claim 1, wherein the one or more epoxides comprises at least three epoxide-group-containing compounds, at least one epoxide-group-containing compound having an epoxide equivalent (EE) of 150 to 225 g/mol, at least one epoxide-group-containing compound having an epoxide equivalent (EE) of 230 to 400 g/mol, and at least one epoxide-group-containing compound having an epoxide-equivalent (EE) of 400 to 1500 g/mol.

19. Dispersion according to claim 1, wherein the one or more matrix polymers comprises one or more thermoplastic polymers having a softening point of between 40 and 120° C.

20. Dispersion according to claim 1, wherein the one or more matrix polymers comprises thermoplastic polyurethane.

21. Dispersion according to claim 1, further comprising an adhesion promoter in dispersed form.

22. Dispersion according to claim 21, wherein the adhesion promoter comprises 3-glycidyloxypropyltriethoxysilane.

23. Dispersion according to claim 21, wherein the adhesion promoter is present in a fraction of up to 5 parts by weight per 100 parts by weight of base components.

24. Dispersion according to claim 1, further comprising one or more additional components in dispersed form.

25. Dispersion according to claim 24, wherein the amount of the additional components is up to 100 parts by weight per 100 parts by weight of the base components.

26. Dispersion according to claim 24, wherein the one or more additional components are selected from the group consisting of a tackifier resin, a thickener, a filler, a dye, an adhesion promoter, a defoamer, and a non-epoxide reactive resin.

27. Method for preparing a surface comprising coating a surface with a dispersion according to claim 1 to form a coated surface and drying the coated surface.

28. Method according to claim 27, wherein the coated surface is dried down to a residual dispersion medium content of not more than 5 wt %, based on pre-dried weight of the dispersion medium on the coated surface.

* * * * *